(12) United States Patent
Mao

(10) Patent No.: US 12,118,676 B2
(45) Date of Patent: *Oct. 15, 2024

(54) SENSORY STIMULUS MANAGEMENT IN HEAD MOUNTED DISPLAY

(71) Applicant: Sony Interactive Entertainment Inc., Tokyo (JP)

(72) Inventor: Xiaodong Mao, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 601 days.

This patent is subject to a terminal disclaimer.

(21) Appl. No.: 17/348,686

(22) Filed: Jun. 15, 2021

(65) Prior Publication Data

US 2021/0312717 A1 Oct. 7, 2021

Related U.S. Application Data

(63) Continuation of application No. 16/697,070, filed on Nov. 26, 2019, now Pat. No. 11,037,371, which is a
(Continued)

(51) Int. Cl.
*G06T 19/00* (2011.01)
*A63F 13/211* (2014.01)
(Continued)

(52) U.S. Cl.
CPC .......... *G06T 19/006* (2013.01); *A63F 13/211* (2014.09); *A63F 13/213* (2014.09);
(Continued)

(58) Field of Classification Search
CPC .... A63F 13/211; A63F 13/213; A63F 13/355; A63F 13/49; A63F 13/53; A63F 13/67;
(Continued)

(56) References Cited

U.S. PATENT DOCUMENTS

| 2012/0174037 A1* | 7/2012 | Relyea | H04N 21/4312 715/848 |
| 2015/0094142 A1* | 4/2015 | Stafford | A63F 13/212 463/31 |
| 2015/0119130 A1* | 4/2015 | Lovitt | A63F 13/847 463/23 |

* cited by examiner

*Primary Examiner* — Kang Hu
*Assistant Examiner* — Jeffrey K Wong
(74) *Attorney, Agent, or Firm* — Penilla IP, APC

(57) ABSTRACT

Methods, systems, and computer programs are presented for managing the sensory stimulus generated by a head mounted display (HMD). One method includes identifying a game state of a game being executed for a current session by a computer for display on a head mounted display (HMD) for a user. Then, determining a game intensity value for said game state based on user intensity feedback received from one or more prior gaming sessions by users. The user intensity feedback describes levels of sensory stimulus obtained from the users during user play of the game via an HMD of the respective users, and the determined game intensity value is calculated by analysis of the levels of sensory stimulus received from the users. Processing the game intensity value to cause a higher rendering priority to a viewpoint of the user's gaze than regions outside of the viewpoint. The viewpoint is a portion of the display of the HMD. The regions outside of the viewport are caused to include a reduction in interactive content presented during execution of the current session of the game.

18 Claims, 13 Drawing Sheets

Related U.S. Application Data continuation of application No. 16/000,808, filed on Jun. 5, 2018, now Pat. No. 10,489,983, which is a continuation-in-part of application No. 14/712,575, filed on May 14, 2015, now Pat. No. 9,990,774.

(60) Provisional application No. 62/035,344, filed on Aug. 8, 2014.

(51) Int. Cl.
*A63F 13/213* (2014.01)
*A63F 13/355* (2014.01)
*A63F 13/49* (2014.01)
*A63F 13/53* (2014.01)
*A63F 13/67* (2014.01)
*A63F 13/822* (2014.01)
*A63F 13/825* (2014.01)
*G02B 27/01* (2006.01)
*G06F 3/048* (2013.01)

(52) U.S. Cl.
CPC ............ *A63F 13/355* (2014.09); *A63F 13/49* (2014.09); *A63F 13/53* (2014.09); *A63F 13/67* (2014.09); *A63F 13/822* (2014.09); *A63F 13/825* (2014.09); *G02B 27/0172* (2013.01); *G06F 3/048* (2013.01); *G02B 2027/0178* (2013.01)

(58) Field of Classification Search
CPC ............ A63F 13/822; A63F 13/825211; A63F 13/825; G06T 19/006; G02B 27/0172; G02B 2027/0178; G06F 3/048; G06F 3/013

See application file for complete search history.

ered for display on a head mounted display (HMD). Further, the
method includes an operation for determining the game
intensity value for the game state based on user intensity
ratings obtained from user play of the game. The user
intensity ratings represent the level of sensory stimulus
presented to users during the user play of the game via the
HMDs of the respective users. Further, the method includes
an operation for presenting the game intensity value to the
HMD for rendering during execution of the game. In one
embodiment, the operations of the method are executed by
a processor.

SENSORY STIMULUS MANAGEMENT IN HEAD MOUNTED DISPLAY

CLAIM OF PRIORITY

This application is a Continuation of U.S. patent application Ser. No. 16/697,070, filed on Nov. 26, 2019 (U.S. Pat. No. 11,037,371, issued on Jun. 15, 2021), and entitled: "SENSORY STIMULUS MANAGEMENT IN HEAD MOUNTED DISPLAY," which is a Continuation of U.S. patent application Ser. No. 16/000,808, filed on Jun. 5, 2018, (U.S. Pat. No. 10,489,983, issued on Nov. 26, 2019), and entitled: "SENSORY STIMULUS MANAGEMENT IN HEAD MOUNTED DISPLAY," which is a Continuation of U.S. patent application Ser. No. 14/712,575, filed on May 14, 2015, (U.S. Pat. No. 9,990,774, issued on Jun. 5, 2018), and entitled "SENSORY STIMULUS MANAGEMENT IN HEAD MOUNTED DISPLAY," which further claims priority to U.S. Provisional Patent Application No. 62/035,344, filed Aug. 8, 2014, and entitled "SENSORY STIMULUS MANAGEMENT IN HEAD MOUNTED DISPLAY," which are herein incorporated by reference.

BACKGROUND

1. Field of the Invention

The present embodiments relate to methods for improving the usability of Head Mounted Devices (HMD), and more particularly, methods, systems, and computer programs for managing the sensory stimulus generated by an HMD.

2. Description of the Related Art

Typically, an HMD is a portable device worn around the head of the user, such that a display situated a short distance from the eyes provides images for user interaction. Sometimes HMDs provide a mixed real-life and virtual life environments, where the user is able to see images created by a computing device, as well as some real-live images. Other times HMDs provide immersive experiences that block the outside world to the user, while providing a virtual world on the HMD display.

However, there can be problems while the user views the real world or the virtual world through the display in the HMD because the computing capability of the HMD may not be adequate to refresh images on the display. This can cause motion sickness or vertigo to HMD users. This phenomenon is especially critical, when the user is interrupted (e.g., receives a phone call) and the user wants to leave the HMD environment fast.

What is needed is an HMD that allows the user to transition out of a virtual world observed through the HMD without creating discomfort on the user.

It is in this context that embodiments arise.

SUMMARY

Methods, devices, systems, and computer programs are presented for managing the sensory stimulus generated by a head mounted display (HMD). It should be appreciated that the present embodiments can be implemented in numerous ways, such as a method, an apparatus, a system, a device, or a computer program on a computer readable medium. Several embodiments are described below.

In one embodiment, a method includes an operation for identifying the game state of a game being executed for display on a head mounted display (HMD). Further, the method includes an operation for determining the game intensity value for the game state based on user intensity ratings obtained from user play of the game. The user intensity ratings represent the level of sensory stimulus presented to users during the user play of the game via the HMDs of the respective users. Further, the method includes an operation for presenting the game intensity value to the HMD for rendering during execution of the game. In one embodiment, the operations of the method are executed by a processor.

In another embodiment, a method includes an operation for identifying a game state of a game being executed for display on a head mounted display (HMD). The method further includes an operation for determining a general game intensity value for said game state based on user intensity ratings obtained from user play of the game. The user intensity ratings represent a level of sensory stimulus presented to users during the user play of the game via an HMD of the respective users. Additionally, the method includes operations for identifying a user intensity parameter for a user playing the game based on a profile of the user, and for adjusting an intensity of multimedia content presented to the HMD based on the general game intensity value and the user intensity parameter.

In yet another embodiment, a non-transitory computer-readable storage medium storing a computer program is presented. The computer-readable storage medium includes program instructions for identifying a game state of a game being executed for display on a head mounted display (HMD), and program instructions for determining a game intensity value for said game state based on user intensity ratings obtained from user play of the game. The user intensity ratings represent a level of sensory stimulus presented to users during the user play of the game via an HMD of the respective users. Further, the storage medium includes program instructions for presenting the game intensity value to the HMD for rendering during execution of the game.

In another embodiment, a head mounted display (HMD) includes a head attachment portion, a viewing module coupled to the head attachment portion, a communications module, and a processor configured to execute a game. The viewing module renders image content, and the processor is configured to identify a game state of the game. The processor is further configured to determine a game intensity value for said game state based on user intensity ratings obtained from user play of the game, the user intensity ratings representing a level of sensory stimulus presented to users during the user play of the game via an HMD of the respective users. Additionally, the processor is further configured to present the game intensity value in the rendered image content.

In yet another embodiment, a head mounted display (HMD) includes a head attachment portion, a viewing module for rendering image content, one or more inertial sensors for tracking motion of the HMD, one or more cameras configured to capture images of eyes of a user wearing the HMD, a communications module, and a processor configured to execute a game. The viewing module is coupled to the head attachment portion. In addition, the processor identifies a game state of the game and determines a user intensity value for said game state based on the motion of the HMD and based on of a gaze of a user wearing the HMD. The gaze of the user is tracked based on image analysis of the captured images. The processor further identifies a game intensity value for said game state based on user intensity ratings obtained from user play of the game, the user intensity ratings representing a level of sensory stimulus presented to users during the user play of the game via an HMD of the respective users. Additionally, the processor is further configured to present the user intensity value and the game intensity value in the rendered image content.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for managing the sensory stimulus generated by a head mounted display (HMD). It will be apparent, that the present embodiments may be practiced without some or all of these specific details. In other instances, well-known process operations have not been described in detail in order not to unnecessarily obscure the present embodiments.

In some embodiments, intensity rating information for the immersion level into the virtual world is provided for users wearing HMDs. The rating information can be provided in several ways, such as an icon, a sliding scale, a color indicator, a counter or a meter, etc., and the rating information is an indicator of how aggressive or intense the content is for presentation in the HMD. The more intense the content, the more likely the user may experience vertigo or a non-friendly experience. The rating information can be collected for specific content from a plurality of users, such as from players affiliated with a social network or a gaming network. Ratings for the difficulty and the intensity of different parts of the game are collected, and information bases on this collected information is displayed in the HMD to let the user form an expectation of the intensity of the game and the multimedia output.

This dynamic collection of ratings can be used to provide other users not familiar with specific games an advance notification of the intensity of specific games, or specific parts of the games, played using the headmounted display.

Figure 1:
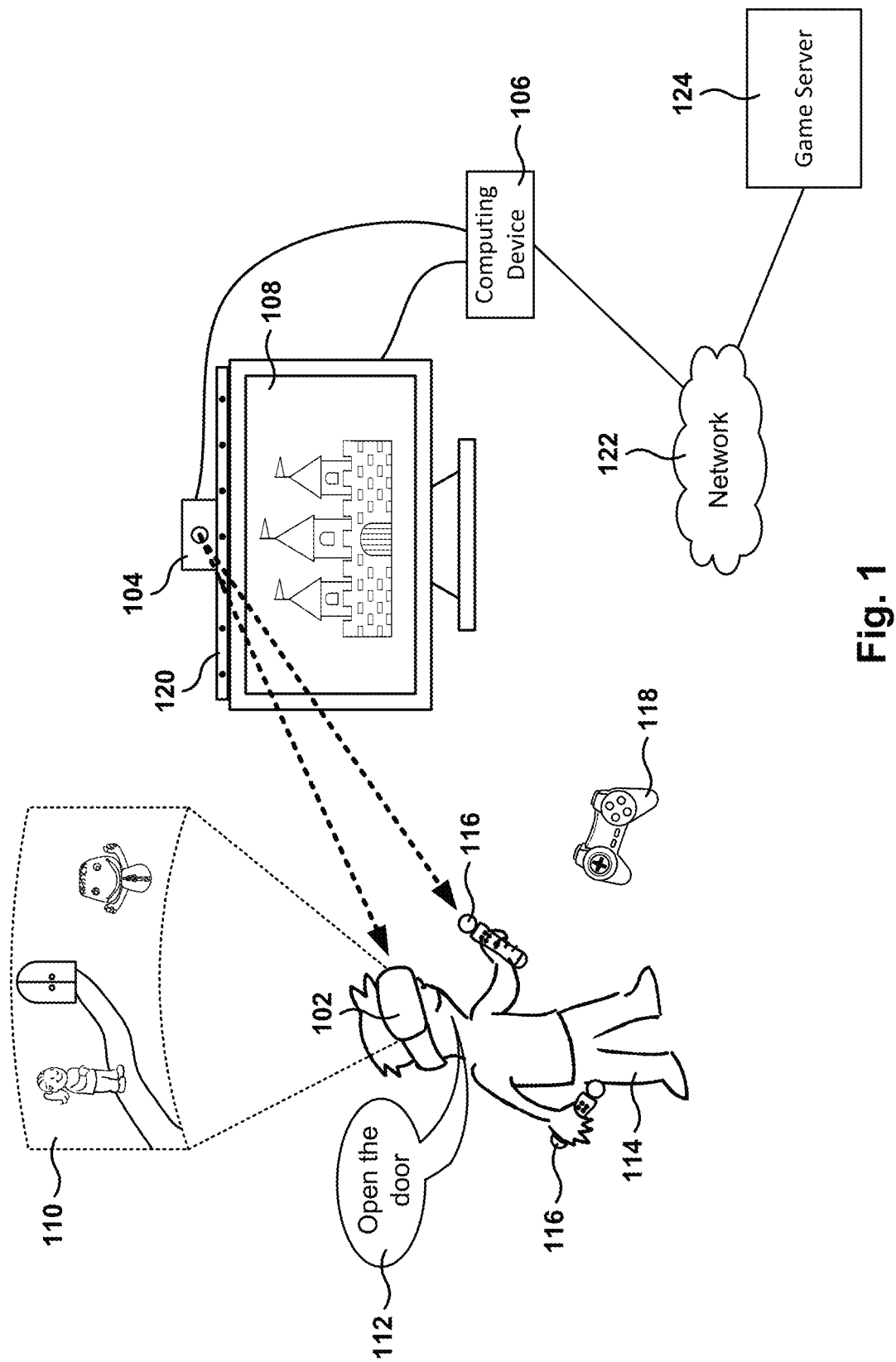
FIG. 1 illustrates a user interacting with a plurality of devices, including a Head Mounted Device (HMD), according to one embodiment.

FIG. 1 illustrates a user interacting with a plurality of devices, including a Head Mounted Device (HMD) 102, according to one embodiment. User 114 is wearing HMD 102, which includes a display 110 that renders images near the eyes of the user. In one embodiment, the images are rendered in 3D. Although embodiments presented herein are described with reference to a display on the HMD 102, other embodiments may use other view rendering methods, such as projecting an image on the retina of the user.

In one embodiment, computing device 106 executes a game that is displayed on the HMD 102. Therefore, computing device 106 cooperates with HMD 102 to display images for playing the game. The processing of game operations may be done on the computing device 106, on the HMD 102, or in both computing device 106 and HMD 102. In another embodiment, the processing of game operations is performed by a networked game server 124, or a cluster of remote game servers (not shown), which cooperate with computing device 106 and/or HMD 102 to display images for playing the game. In yet another embodiment, the HMD 102 cooperates with game server 124 for playing the game.

In the embodiment of FIG. 1, HMD 102 communicates wirelessly (e.g., WiFi, Bluetooth, etc.) with computing device 106. In other embodiments (not shown), HMD 102 may be wired directly to computing device 106, or in communication with computing device 106 via a network (e.g., the Internet). For example, computing device 106 may be a server on a network that provides game services. In some embodiments, the HMD is an autonomous game-playing device and the game is executed directly on the HMD, without the need of an external device to run the game.

In one embodiment, a camera (or cameras) is coupled to computing device 106. If the computing device 106 is a server on a network, camera 104 may be a networked camera that sends images to the computing device via the network (e.g., via the Internet). Camera 104 may be one or more of a regular image camera, a stereo camera (i.e., with two or more lenses that capture images from the playing area), an infrared camera, a depth camera, a 3D camera, etc.

Images taken with camera 104 may be processed to track the location and movement of HMD 102. In addition, the images may also be used to track the location and motion of the user or a feature of the user (e.g., head of the user, mouth of the user, hands of the user, torso of the user, etc.), of a controller (e.g., one-handed controller 116, two-hand controller 118), or of any other element in the play area.

In one embodiment, the user may provide commands via voice recognition, which may be performed by computing device 106 via sound capture through one or more microphones 120, or may be performed by HMD 102 which also includes, in one embodiment, one or more microphones. In another embodiment, user 114 may also enter inputs via gestures that are analyzed and recognized by computing device 106.

In one embodiment, the computing device 106 is also connected to a display 108, which may perform some game operations. For example, display 108 may provide instructions to the user before the user puts on the HMD 102. In another embodiment, display 108 provides the same, or similar, display shown on the HMD so other players in the vicinity may perceive the progress of the user 114 on the game displayed on the HMD 102.

In one embodiment, the user holds one or more controllers 116. The computer device 106 tracks the location and movement of the controller, and operations related to the motion of the controller, or inputs entered with the controller, may be used as inputs for the game. For example, the controller may represent the handle of a sword, and the sword is displayed in the game scene. As the user moves the controller, the sword moves in the virtual world in synchronism with the controller. This way, the player is able to perform a fighting game operation where the sword is the weapon.

In one embodiment, the computing device 106 calculates a relative position between the HMD 102 and the game controller 116. The relative position is then used by the game to move a game object in synchronism with the HMD 102.

The computing device may also track a second controller 116, that may also be linked to a game object that is rendered on the display of the HMD. For example, the second controller may be a shield, and the user is able to fight with the sword and the shield in the virtual world. In other embodiments, the controller may be used in the game for other purposes, such as a weapon (e.g., a gun, a rifle or any type of firing weapon, an axe, a laser gun, a steering device-a steering wheel or handles of a motorcycle-a flashlight, a hammer, a shield, etc.

In another embodiment, the user may also interact with a two-handed controller, which may be used in similar fashion as the one-hand controller. For example, the two-handed controller may be used as a steering wheel.

In another embodiment, the inputs entered with the controller, such as by pressing buttons on the controller, may be used to perform commands in the game. For example, the user may use the buttons on the controller to move an avatar in the game, to fire a weapon, to grab an object, etc.

It is noted that the embodiments illustrated in FIG. 1 are exemplary. Other embodiments may utilize different devices, a different number of devices, have more or less interaction between the different devices, use other ways of communication (e.g. ultrasonic), facilitate a multiplayer game with two users wearing respective HMD's play the same game, etc. The embodiments illustrated in FIG. 1 should therefore not be interpreted to be exclusive or limiting, but rather exemplary or illustrative.

Figure 2:
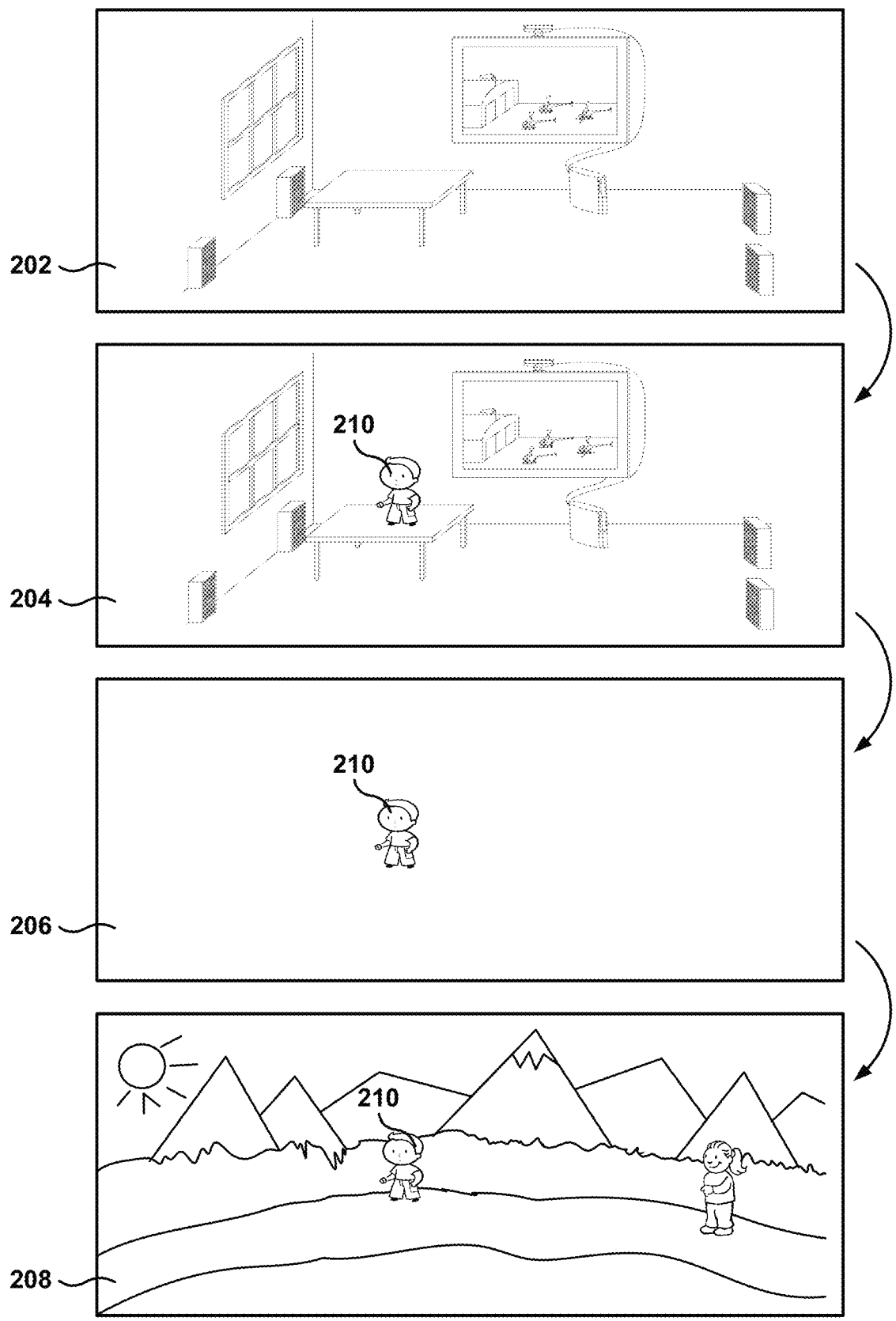
FIG. 2 illustrates a transition from real-life to augmented reality to virtual world views, according to one embodiment.

FIG. 2 illustrates a transition from real-life to augmented-reality to virtual-world views, according to one embodiment. Augmented reality (AR) is a live, direct or indirect, view of a physical, real-world environment whose elements are augmented by computer-generated sensory input such as sound, video, or graphics. Augmented reality is related to a general concept called mediated reality, in which a view of reality is modified (possibly even diminished rather than augmented) by a computer. By contrast, virtual reality replaces the real world with a simulated one. Artificial information about the environment and its objects can be overlaid on the real world.

Some HMDs allow a Computer-Generated Image (CGI) to be superimposed on a real-world view to create an augmented reality or mixed reality. Combining real-world view with CGI can be done by projecting the CGI through a partially reflective mirror and viewing the real world directly. This method is often called Optical See-Through. Combining real-world view with CGI can also be done electronically by accepting video from a camera and mixing the video electronically with CGI. This method is often called Video See-Through.

In one embodiment, the HMD includes a front facing camera (facing out from the face of the user) that captures the world in front of the user. The video or images captured by the camera can then be reproduced on the display to create the see-through view. In order to place virtual objects on a real scene, the HMD needs to know how to identify a place in the real world where the virtual object can be placed. For example, a virtual character may be placed on a table or some other flat surface. Of course, in other embodiments the virtual object may be placed floating on the room, and all the HMD needs to do is present the virtual object at a distance from the HMD where no real world object is situated.

In one embodiment, the HMD uses the video images to determine the location of objects in the room. The camera may be a stereo camera or a depth camera used to determine the distances with reference to game objects. Once the HMD determines a flat surface, the virtual object may be placed on that surface.

In another embodiment, the positions of the real-world objects are calculated by a camera coupled to a computing device, such as a game console in communication with the HMD. The computing device is also tracking the location of the HMD, so the computing device may calculate the relative positions of objects in the room with reference to the HMD. The computer device transmits this information to the HMD in order to provide information about the real-world environment and the location of objects.

A sudden transition from real live images to a virtual world displayed on the HMD may confuse the senses and create the possibility for vertigo. Also, if the HMD presents great deal of sensory information changing rapidly (e.g., lots of motion and moving elements in a 3-D display), vertigo or dizziness is also possible.

In one embodiment, to acclimate the user to enter into a virtual world, an intermediate augmented-reality view is provided. Initially, a see-through view 202 is presented to the user. Afterwards, in a second view 204, a game object 210 (e.g., a character, although any other virtual object may be used) is placed in the augmented-reality view. For example, the game object 210 may be placed on top of a table, or hanging on a wall, or in a TV screen, or on top of the game console, etc.

Then, the real world view is gradually faded out resulting in a virtual view 206 with only the game object 210. Afterwards, other game objects are gradually faded into view until the complete virtual world is rendered in view 208.

In one embodiment, the virtual world expands in circular fashion from the game object 210 until the complete display is filled up with the virtual scene. In another embodiment, virtual objects are added to the virtual scene one of the time, until all the virtual objects have been added.

In some embodiments, the virtual scene is frozen (i.e., no virtual object is in motion) until the entire virtual scene is filled up and the player is completely acclimated in.

It is noted that the embodiments illustrated in FIG. 2 are exemplary. Other embodiments may utilize different transitions, different virtual objects, different order of operations, etc. The embodiments illustrated in FIG. 2 should therefore not be interpreted to be exclusive or limiting, but rather exemplary or illustrative.

Figure 3A:
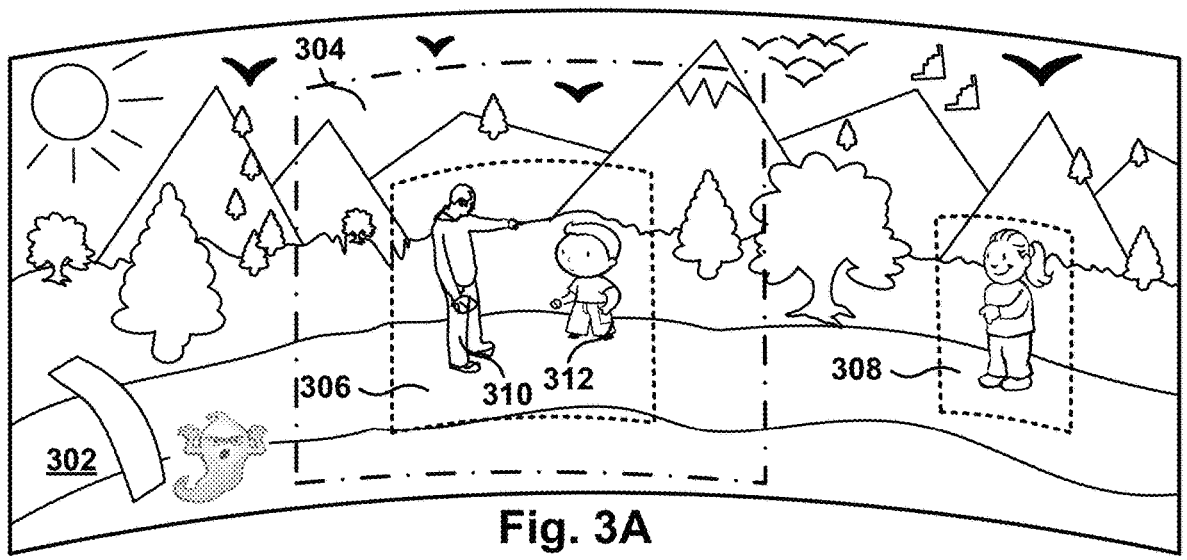
FIGS. 3A-3C illustrate a method for exiting a virtual environment shown on the display of an HMD, according to one embodiment.
Figure 3B:
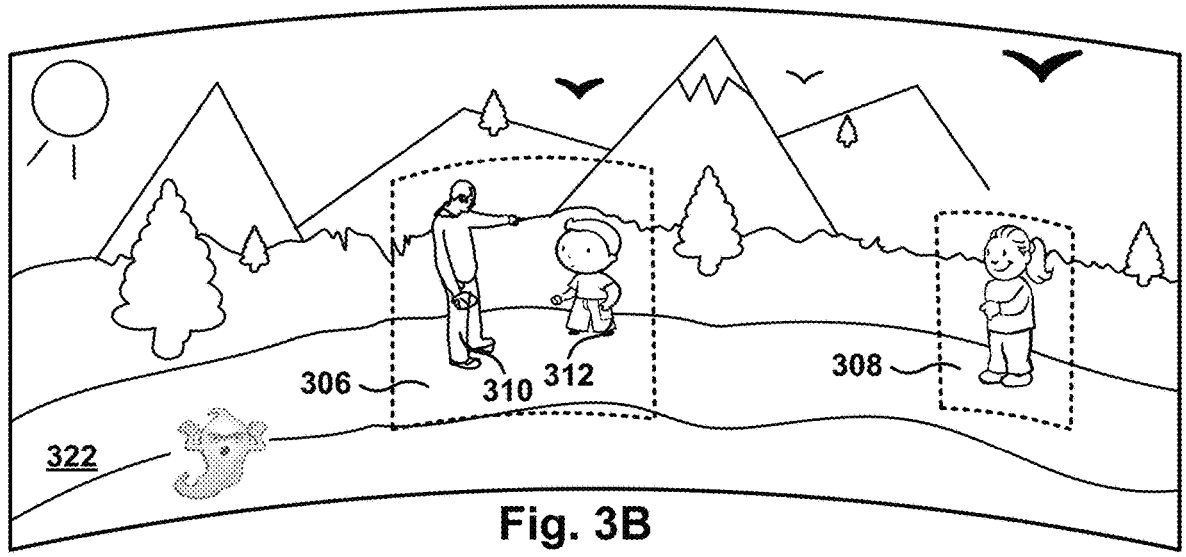
Figure 3C:
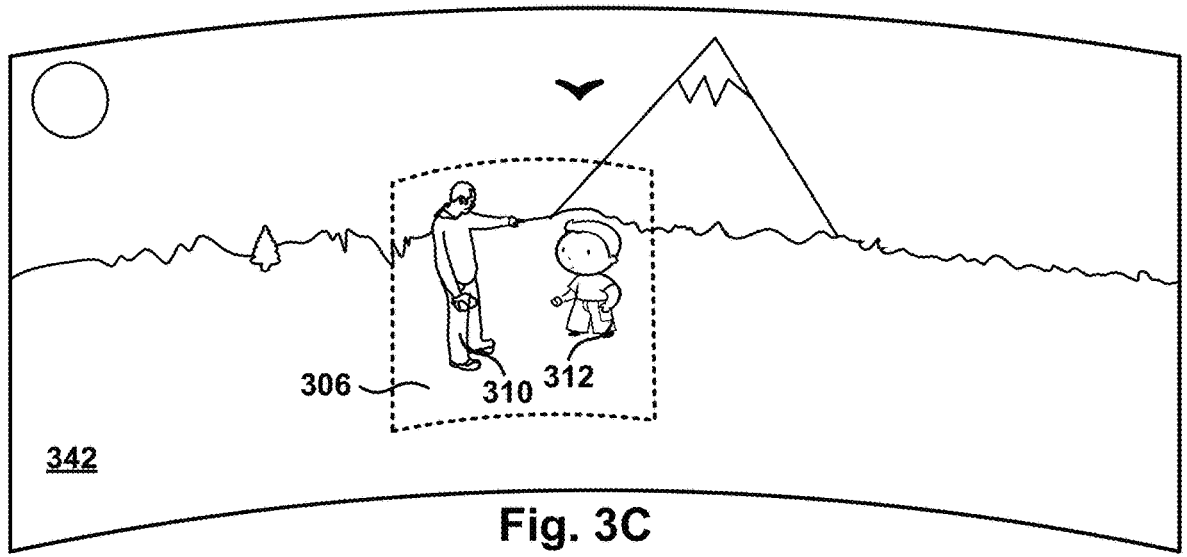

FIGS. 3A-3C illustrate a method for exiting a virtual environment shown on the display of an HMD, according to one embodiment. FIG. 3A illustrates a game scene shown on the display of an HMD, according to one embodiment. In some embodiments, gaze tracking and HMD-motion tracking are used to prioritize the scanning out of different regions on the HMD display.

In one embodiment, the screen is partitioned into a plurality of regions or sections, and the regions are updated with different priorities and with different levels of resolution. This means that some regions may be refreshed more frequently than others or with a higher resolution.

The HMD tracking assists in determining where the user is going to project their gaze, because when the user is going to change their gaze there is a natural instinct to move the head in the same direction, even though the movement of the head may be slight when compared to the movement of the eyes. For example, if a user is looking straight ahead and the head (together with the HMD) starts moving towards the left, the computing device projects that the user is going to move their gaze to the left. In response to this detection, the areas on the left of the screen are rendered with higher priority than the areas on the right side of the screen. In fact, it is very probable that the areas towards the right border of the screen will disappear from view as the scene shifts towards the left.

By prioritizing the scanning out of the different regions, it is possible to give a better experience to the user by focusing on where the user is looking, or where the user is going to look next, and more efficiently applying computer resources to enable rendering the user's view faster and with better quality.

Embodiments presented herein are described with reference to virtual-reality displays, where the screen shows exclusively scenes created by a computing device. However, the principles presented herein may also be applied to augmented-reality games, where the view on the screen is a combination of real-world images and computing-device generated images. In one embodiment, the game is played on an extensive virtual world. The user sees only a part of the virtual world at any time, and the user is able to move around the virtual world. As the user moves around the virtual world, other parts of the virtual world are exposed.

In some embodiments, the current user's viewpoint 304 is given a higher rendering priority than regions outside the user's viewpoint 304. The user's viewpoint is defined as an area on the display where the user is focusing their view. Therefore, most of the game interactions occur within the user's viewpoint 304. Of course, the gaze of the user is centered around the viewpoint 304.

Many people are able to see within their field of view an area that goes from about 90° to the left to about 90° to the right. However, the areas on the periphery of the user's vision are not perceived clearly, although a person may feel some motion or changes within those periphery areas.

In the embodiment shown in FIG. 3A, the viewpoint is defined as a rectangular section on the screen, where the gaze of the user is centered within this rectangular section.

However, other types of viewpoint areas may be defined. For example, in one embodiment the viewpoint area is defined as a circle around the gaze point of the user on the screen. A viewing angle is defined with reference to a line from the midpoint between the eyes to the gaze point on the screen. The radius of the viewpoint circle is then determined by the viewing angle. In some embodiments, the viewing angle may have values in the range of 5° to 45°, but other values are also possible.

In some embodiments, the rendering policy requires that regions with game characters (e.g., region 308, 306) are given higher rendering priority that regions without game characters. In other embodiments, another rendering policy gives higher scan out priority to game characters and special game objects ranked as important game objects by the game. For example, an important game object may be an exit door, a navigation console in a car or plane, a target on a soothing game, an enemy aircraft, etc. In general, an important game object is an object that can be acted upon by the user, while non-important game objects are rendered in the background to fill out the scene.

Region 306 (including game characters 310 and 312) and region 308 are regions with game characters and are given a higher rendering priority than the rest of the display. Of course, in some embodiments this is only a factor in calculating the final rendering priority, as the rendering priority may be altered by some other rules, such as when the user is moving their gaze or their head.

In one embodiment, blurring on the screen may occur when the user moves their head fast because the fast motion requires a fast update of the display, and the HMD may not have enough computing resources to keep up with the motion of the user. In order to avoid blurring while the HMD is in fast motion, the rendering policies start refreshing faster the regions associated with the motion of the user, and some other the regions might be refreshed at lower frequency or with lower resolution. Once the HMD stops moving, the higher quality of the scanned out image is restored.

Further, it is noted that in order to predict the trajectory of the gaze of the user, the computing device tracks the trajectory of the gaze of the user over a predetermined period of time, and also tracks the trajectory of the HMD over the predetermined period of time (or some other period to time). The historical data is used to predict the trajectory of the gaze of the user by analyzing the trend in the gaze motion and in the HMD motion.

FIG. 3A illustrates a presentation on the display of the HMD when the user is provided with full interactivity and 3-D effects, with complete immersion into the virtual world.

FIG. 3B illustrates the presentation on the display after an operation for acclimating out the user begins, according to one embodiment. As the user starts the exit process, the HMD begins to acclimate the user by lowering the intensity of the presentation to the user. While exiting, the interactivity, 3-D effects, sensory intensity, etc., are gradually reduced, in one embodiment.

In the exemplary embodiment of FIG. 3B, some of the visual elements on the display are eliminated gradually and 3-D effects are reduced to start adjusting the user's senses to a 2D presentation on the display before taking off the HMD.

By eliminating some of the graphic elements of the display (e.g., backgrounds), the user is provided with less elements on the display. For example, if a user is in the middle of a fight, graphical elements unrelated to the fight may be discarded, grayed out, made transparent, etc., to reduce their visual impact on the user. However, other parts related to the fight (e.g., enemies, weapons, shields, etc.) are still maintained while the user is acclimating out because these elements would be more noticeable if suddenly removed.

In one embodiment, the elements inside the user's viewpoint 304 are left unchanged because that is where the user is focusing their attention. In another embodiment, areas with game characters (e.g., 306 and 308) are also kept unchanged during the initial phase of the exit process.

Additionally, the exit process may also reduce how fast elements are moving on the display. In other words, the action in the game is slowed down to reduce the sensory output produced by the HMD. For example, the tree leaves or cars in the scene may move slower. Further yet, the HMD may gradually, in one embodiment, transition from 3-D to 2-D effects.

FIG. 3C illustrates the next operation following the deal on the display of FIG. 3B. FIG. 3C has reduced the elements on the display to present a minimalist view on the display. Of course, the process of transitioning from the display of FIG. 3A to FIG. 3C is done over a period of time, which may vary according to different embodiments.

At this point, the signal is provided to the user that the HMD may be removed, and because of the acclimatization operations, the user will be able to remove the HMD safely, lowering the possibility of vertical or disorientation when the user starts receiving sensory inputs from the real world outside the virtual world presented by the HMD.

It is noted that the embodiments illustrated in FIGS. 3A-3C are exemplary. Other embodiments may utilize different types of viewpoint areas, different types of displays, different rendering policies, etc. The embodiments illustrated in FIGS. 3A-3C should therefore not be interpreted to be exclusive or limiting, but rather exemplary or illustrative.

Figure 4A:
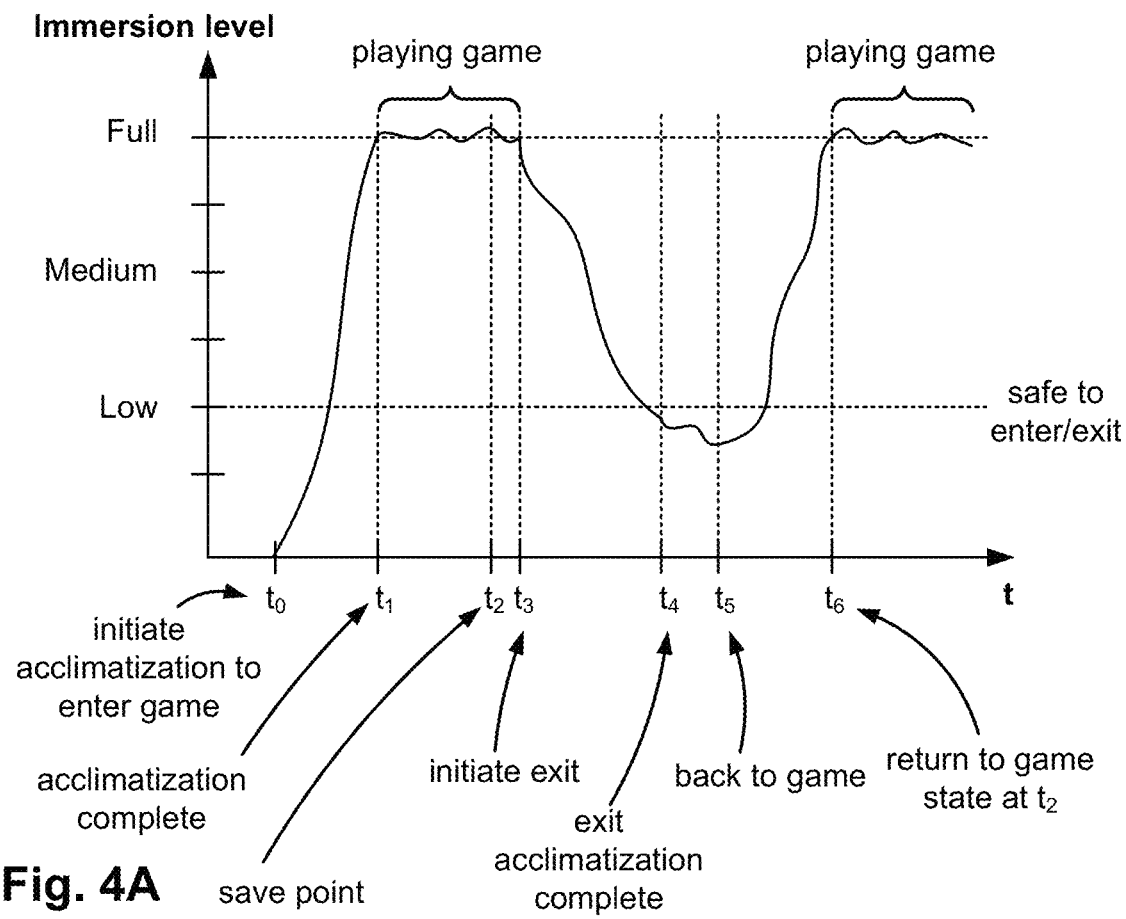
FIG. 4A illustrates different phases of immersion for the HMD view, according to one embodiment.

FIG. 4A illustrates different phases of immersion for the HMD view, according to one embodiment. When the user gets interrupted while playing a game, it's important that the user resumes the gaming activity (e.g., the game returns to the same place where the user was) without hurting progress in the game for the user. For example, a user would hate to lose a life in the game just because somebody called her on the phone.

In one embodiment, the system detects the exit command and starts the acclimatization out, as previously discussed. The system (e.g., the HMD, the game console, or both) saves the game status to enable the user to return to the game at the same place where he stopped. In one embodiment, the game keeps a history of game activity and when the player returns, game play is resumed at a point corresponding to a short time before the user started the exit process. For example, the user may have been interrupted by a real-life event, and it may have taken the user a few seconds to enter the exit command. This delay may cost the user some loss of game progress. In order to avoid dissatisfaction with the game, the game returns to a point where it is safe to assume that the user was still fully engaged in playing the game. In some embodiments, a margin interval, which is defined as the difference between the restore time and the time when the exit command was entered, is used. The restore time is the time where the game is resumed when the player returns to the game.

FIG. 4A illustrates an example of how a player enters and exits the game. For description purposes, the immersion level is defined as the degree of acclimatization of the user to the HMD. A full immersion level means that the user has been acclimatized to the HMD, and a low immersion level means that the user has not gone through acclimatization process to start using the HMD. In a full immersion level, the sensory output provided by the HMD is at a high level, including potential for full 3D graphics, virtual objects, surround sound, fast moving objects, etc.

Initially, at $t_0$, the user puts on the HMD and starts to acclimate in. After a while, at $t_1$, the user has been acclimatized and starts playing the game. A while later, at $t_3$, the game detects that the user needs to be acclimated out, either because the user has entered a command, or because the system has detected a potential problem.

After the process to acclimate out ends, at $t_4$, the user is able to take off the HMD. Later, at $t_5$, the user puts on the HMD again and requests to be acclimated in again. At $t_6$, the user has been acclimated in and game resumes.

In one embodiment, the game resumes at exactly the same status as the game was at the time $t_3$ that the user started to acclimate out. In other embodiments, the game will resume a game state corresponding to a time previous to the time when the exit process started, such as at $t_2$.

Figure 4B:
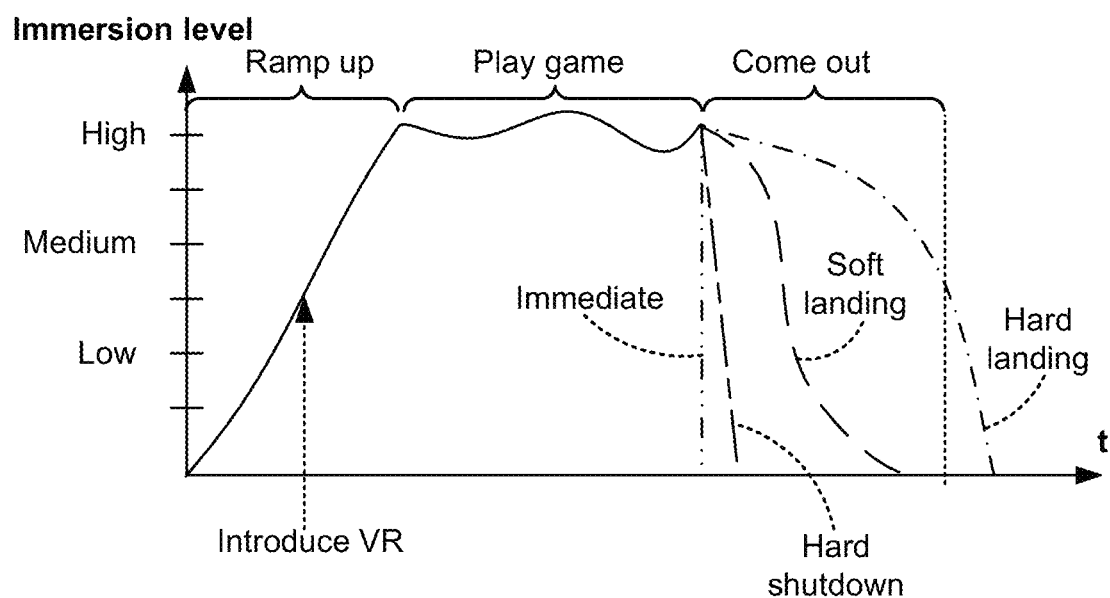
FIG. 4B illustrates different embodiments for exiting virtual reality.

FIG. 4B illustrates different embodiments for exiting virtual reality. FIG. 4B illustrates an exemplary immersion level over time for a player. After the initial ramp up period, in which virtual reality is introduced, the player plays the game where the immersion level changes according to the different game activities.

If the game is being stopped, the problem is to figure out how slow or how fast the acclimatization process should be. It will depend on how immersed the player is, the game activity taking place (e.g., in the middle of a battle or just walking along the virtual reality world), etc.

If the player enters an instruction to come out of the virtual reality game, the process to acclimate the player to exit the virtual reality begins. There are several ways in which the player can come out of the game. In one embodiment, the player comes out immediately, i.e., all the virtual elements are eliminated from the display of the HMD, and the player is presented with either a dark screen (e.g., no images on the screen) or a view of the real world. In some scenarios, the immediate exit may reduce vertical or physical discomfort on the player because the senses do not have time to become confused by other gradual changes.

In another embodiment, referred to herein as a hard shutdown, the player is taken out of the virtual world very fast, although not instantly. For example, the player is taking from the virtual world to the real world in a few seconds, such as in a range from 1 to 5 seconds, or in a range from 3 to 10 seconds, although other values are also possible.

In another embodiment, referred to herein as a soft landing, the acclimatization has an initial phase with the rapid elimination of virtual reality elements, followed by a small introduction of real-world elements. In yet another embodiment, referred to herein as a hard landing, there is an initial phase with slow elimination of virtual reality followed by a quick change into a real world view.

It is noted that these embodiments are exemplary. Other embodiments may utilize different rates of acclimatization for exiting virtual reality. The embodiments illustrated in FIG. 4B should therefore not be interpreted to be exclusive or limiting, but rather exemplary or illustrative.

Embodiments analyze multiple factors to determine the best exit strategy. The factors include one or more of a player profile (e.g., age, experience), game level, game difficulty, game activity, amount of time the player has been immersed, game settings (e.g., developer sets parameters recommended for exiting VR), characteristics of the headset, ambient temperature, current brightness of the HMD display (e.g., the player is in a night environment, or the player may be in a very bright daylight), etc.

For example, if the user is playing a game of bowling and few elements are moving on the screen, then virtual reality elements may be reduced or suppressed rather quickly. However, if the player is riding a roller coaster moving at a fast speed in the virtual world, then the exit process will be lower, maybe starting by reducing the speed of the roller coaster and decreasing the amount of virtual elements on the display.

Depending on the current intensity level when a user decides to exit the HMD, the acclimatization process is adjusted to exit the game as soon as possible without causing discomfort for the player. If the player is in a low intensity activity (e.g., walking around the virtual worlds), the exit can be faster than if the player is in a high intensity activity (e.g., fighting a dragon).

Figure 4C:
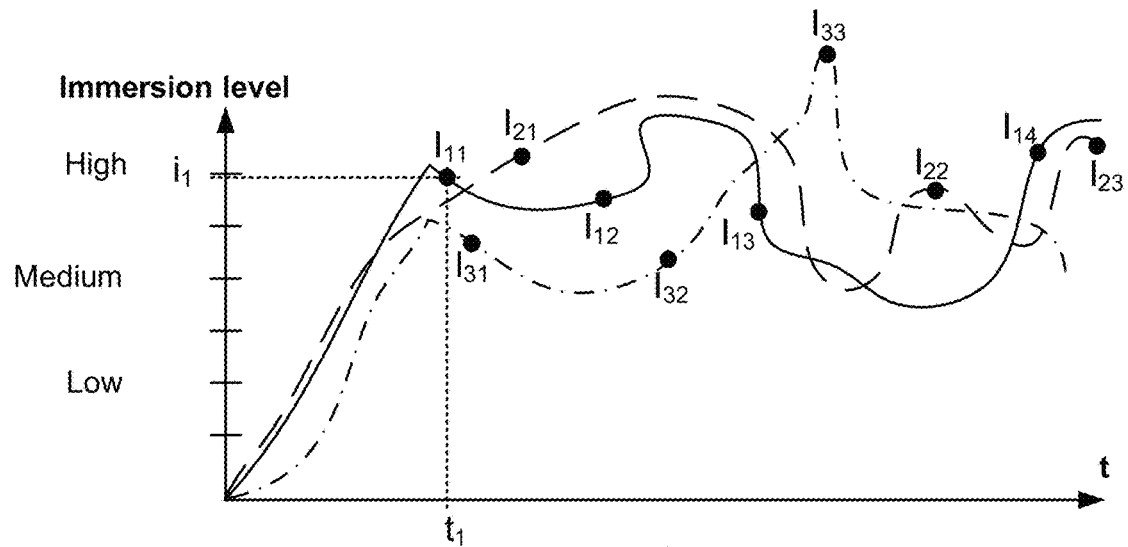
FIG. 4C is a chart tracking intensity levels in a game based on user input, according to one embodiment.

FIG. 4C is a chart tracking intensity levels in a game based on user input, according to one embodiment. In order to define an exit strategy for the user, knowing the context of the game and the user are evaluated to define an exit strategy that acclimates the user to leave the game as fast as possible without creating discomfort.

However, determining the context may be a complex problem due to all the possible variables involved in identifying the game state and the user state. For example, some games include random events that may cause that a user having an avatar in a certain part of the virtual world may be experiencing a different game experience than a second user in the same part of the virtual world.

In one embodiment, in order to determine the intensity level while playing the game, users are provided with options to enter intensity tags $I_i$ that identify the intensity (i.e., immersion level) experienced by users at different times.

FIG. 4C is a chart showing the immersion levels of several players over time. The initial ramp up period is similar for all players, and afterwards players experience different degrees of immersion. Embodiments presented herein allow players to tag the immersion levels at different times. For example, player 1 has defined tags $I_{11}$, $I_{12}$, $I_{13}$, and $I_{14}$, player 2 has defined tags $I_{21}$, $I_{22}$, etc. The first index in the tag corresponds to the user and the second index is a sequencer for the tags entered by a user. In other embodiments, the tags are also associated with an area of the virtual world where the user is currently playing the game, as described in more detail with reference to FIG. 6 below.

Each tag $I_i$ is defined by a pair of values (i, t), where i is the immersion level and t is the time when the tag was created (e.g., $i_1$ and $t_1$ for $I_{11}$). Each immersion level value is the intensity level identified by the corresponding user at a point in time. The immersion level may vary depending on the user and what the user is doing in the game. For example, some users may move slower while other users may move faster through the virtual world (e.g., walking versus driving a vehicle). Also, players may visit different areas of the virtual world. A user may walk by a dragon and miss it, therefore, having a less intense experience that a user that engages the dragon in a fight. Players have different experiences when playing the game.

In one embodiment, the tags entered by users are added to the user profile and may be saved in a game console, in a network server, in the HMD, or any combination thereof.

Figure 5:
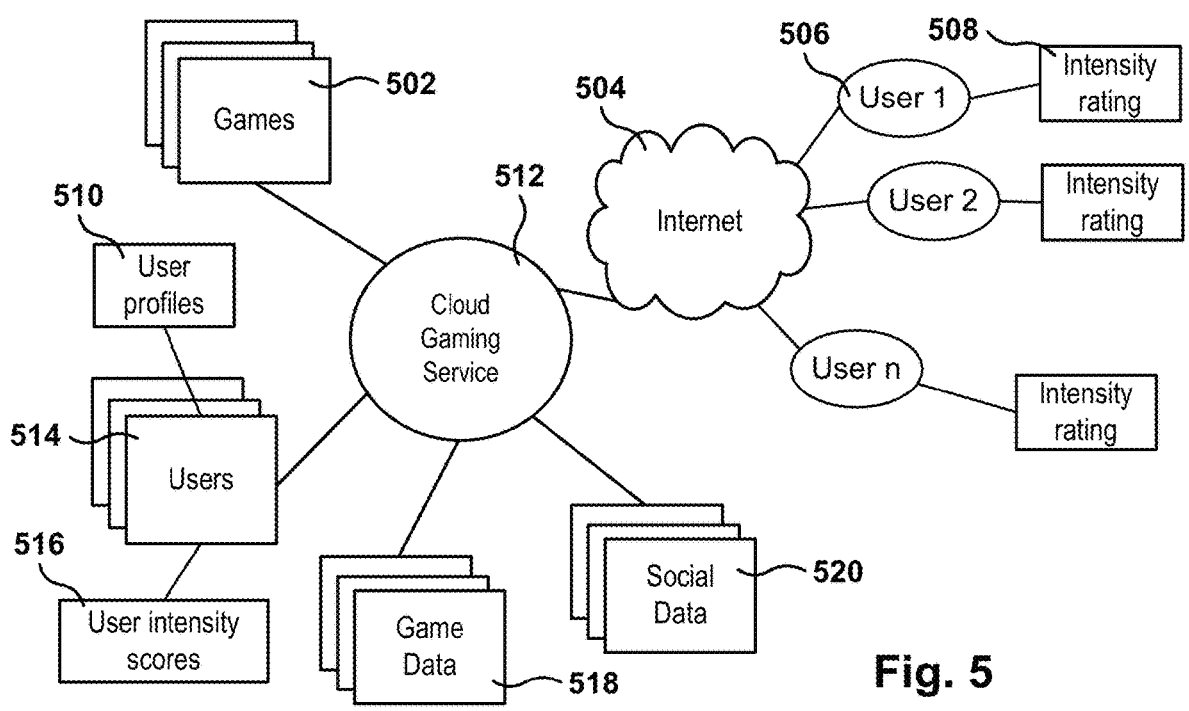
FIG. 5 illustrates an architecture for implementing embodiments presented herein.

FIG. 5 illustrates an architecture for implementing embodiments presented herein. In this illustration, the game content provided to the HMD is in a rich interactive 3-D space. The game content can be downloaded to a client system 506 or can be executed in one embodiment by a cloud gaming service 512. Cloud gaming service 112 can include a database of users 514, which are allowed to access particular games 502, share experiences with other friends, post comments, and manage their account information.

The cloud gaming service 512 can also store game data 518 for specific users, which may be usable during gameplay, future gameplay, sharing to a social media network, or for storing trophies, awards, status, ranking, etc. Social data 520 can also be managed by cloud gaming service 512. Cloud gaming service 512 may also include user profiles 510, where each user profile includes information about a user that may include one or more of user name, user demographic information, historical data, game data, intensity tags (also referred to herein as user intensity scores, or immersion scores, or immersion levels, or intensity ratings), HMD configuration settings, social data, and other data.

The user intensity scores are also kept by the cloud gaming service 512. Additionally, the intensity scores 508 may also be kept or captured by the client systems. In one embodiment, cloud gaming service 512 cooperates with client devices 506 to share information regarding intensity levels, game data, user profile data, and social data.

The social data can be managed by a separate social media network, which can be interfaced with cloud gaming service 512 over the Internet 504. Over the Internet 504, any number of client systems 506 can be connected for access to the content and interaction with other users.

The three-dimensional interactive scene viewed in the HMD can include gameplay, such as the characters illustrated in the 3-D view. In one embodiment, a character or avatar is controlled by the user wearing the HMD.

Game logic may be executed in cloud gaming service 512, and client system 506, or in both. The game logic communicates with the different users playing the game in order to capture user data, including intensity ratings.

In one embodiment, the profile of the user includes data for the game being played. In one embodiment, the profile of the user includes at least one or more of the following values:

user metadata
user settings
historical statistics
sharing history
multiplayer activities
game scores
intensity ratings
intensity settings set by user for playing one or more games, including a default intensity setting
levels played, and
social screen The social screen is a presentation of the game being played with the HMD in a standard TV or PC display allowing users without the HMD to follow the game action and even participate in the game. The social screen may be presented to users near the HMD-wearing user or to remote users connected over a network.

It is noted that the embodiments illustrated in FIG. 5 are exemplary. Other embodiments may utilize different data organization, or organize the same data in a different way, or combine the data into a single database, etc. The embodiments illustrated in FIG. 5 should therefore not be interpreted to be exclusive or limiting, but rather exemplary or illustrative.

Figure 6:
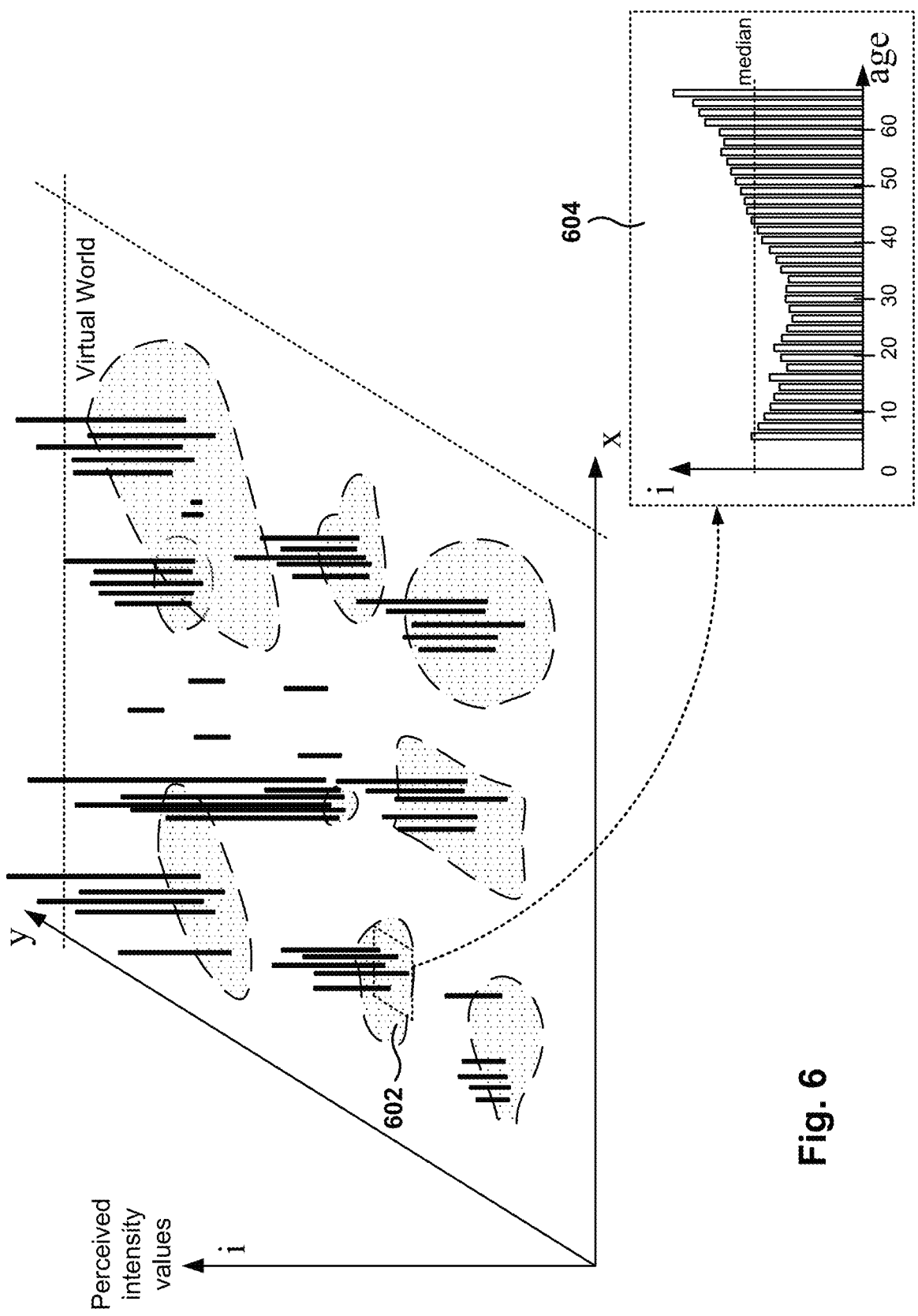
FIG. 6 illustrates a graphical representation of intensity tags collected for different areas of the virtual world, according to one embodiment.

FIG. 6 illustrates a graphical representation of intensity tags collected for different areas of the virtual world, according to one embodiment. In one embodiment, the intensity ratings entered by users are categorized according to the area of the virtual world where the user is located (e.g., the avatar of the user) when entering the intensity ratings.

FIG. 6 shows a three-dimensional representation of the intensity ratings within the virtual space. The x and y axes correspond to the coordinates of a map of the virtual world. The third dimension i corresponds to the intensity value. In FIG. 6, the intensity tags are represented by vertical lines, the length of the vertical line corresponding to the value of the intensity for that entry.

In one embodiment, intensity game areas (e.g., 602) are defined within the virtual world. The intensity game areas may be defined by game developers, or may be defined by a statistical analysis of the intensity tags entered by users. For example, the intensity tags are analyzed and clusters of intensity tags are identified, wherein each cluster includes a high concentration of intensity tags. These clusters typically correspond to areas of the game of high activity, such as riding a roller coaster, fighting battles, shooting at targets, danger areas, etc.

In one embodiment, the clusters are used to provide intensity values to users and inform the users that the area where the users are in, or that the users are entering, may be a high intensity level area. In one embodiment, the users may customize the game in order to put boundaries on the intensity levels presented on the HMD. For example, a user may identify that the user wants to play only at a "medium intensity" rating. This way, the game will lower the sensory outputs (e.g., the immersion level) presented to the user in high intensity area, in order to present the game at the medium intensity level.

In one embodiment, the intensity ratings are also categorized according to some factor (e.g., demographic) in order to identify trends in the perceived intensity values entered by users. For example, the intensity tags may be categorized according to age, gender, geographic location of the user, amount of time spent playing the game, level achieved, scores achieved, trophies won, etc. The categories may be performed for the game as a whole, or for parts of the game, such as cluster 602.

The chart 604 is a histogram of the intensity values tagged by users according to their age within a cluster or region of the virtual world. For example, older players may be more sensitive to virtual reality elements that stimulate the senses than younger players. Therefore, the intensity tags will tend to be higher for older users. Of course, this chart is presented only as a way of example and other types of distribution may also be found when measuring the intensity levels.

The intensity ratings are saved in storage, and when somebody begins to play a game, the user can look at other users' ratings and see the intensity level of the game or of a section of the game. A user may want to set a setting to exclude intensity settings of "very high" or above, because the user gets dizzy at those levels. It is possible to create a "low intensity" version of a game for users that are susceptible to vertigo, similar to an edited version of an R-rated movie for presentation in TV or to non-R audiences. Also, in one embodiment, some intense activities in the game may be suppressed for users playing a "low intensity" version of the game.

In addition, the ratings may be broken down by categories within the game (e.g., depending on game activity) and the user has an option, in one embodiment, to view the details for the intensity levels.

In one embodiment, the user is given warnings that the user may be entering an area or an activity with increasing levels of immersion. This will prepare the player for the increased levels of sensory inputs coming up.

Figure 7A:
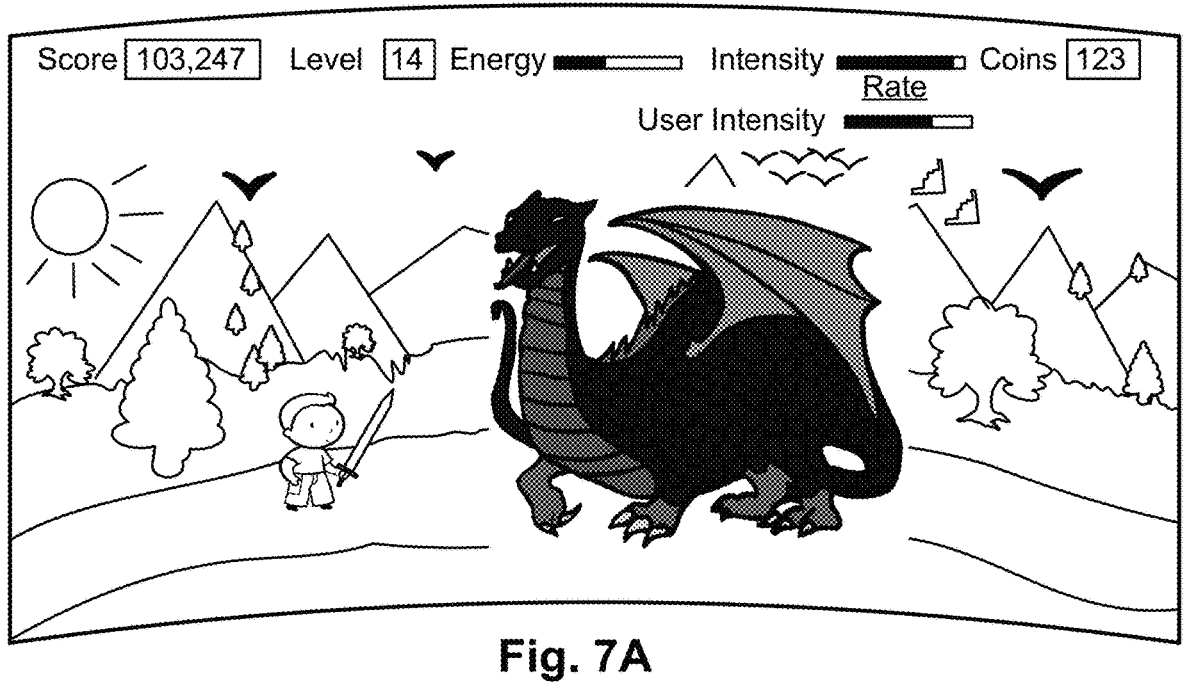
FIG. 7A illustrates a display capture that includes an intensity rating, according to one embodiment.

FIG. 7A illustrates a display capture that includes an intensity rating, according to one embodiment. In one embodiment, the game display includes several game parameters, including the score, the level in the game reached by the player, an energy bar showing the amount of energy left for the avatar, an intensity rating bar (e.g., with a high intensity level because the avatar is engaged in a fight with a dragon), an amount of currency owned by the player (e.g., coins), etc.

In one embodiment, the game calculates a current user intensity value based on one or more parameters, including tracking physical manifestation of the user behavior (e.g., equilibrium, reaction time, erratic movements, erratic motion of the eyes, elevated heart rate, user falling down, etc.), program-defined parameters for the current activity, amount of time played, user experience, etc. The current user intensity value is displayed to the user to provide an intensity value based on the user situation, which is different from the intensity value displayed that is calculated based on inputs from the user community that plays the game.

Additionally, the display presents an option (i.e., "Rate") to rate the current intensity level, as perceived by the player. If the player selects the Rate option, the game captures the intensity tag, such as the one shown in the example below with reference to FIG. 7B.

The player may select the Rate option in any way provided by the game interface, such as by clicking with a mouse cursor over the word Rate, or by fixing the gaze on the word Rate, or by pushing a button on a controller, or by giving a verbal command (e.g., "Rate Intensity"), by making a gesture, etc.

Figure 7B:
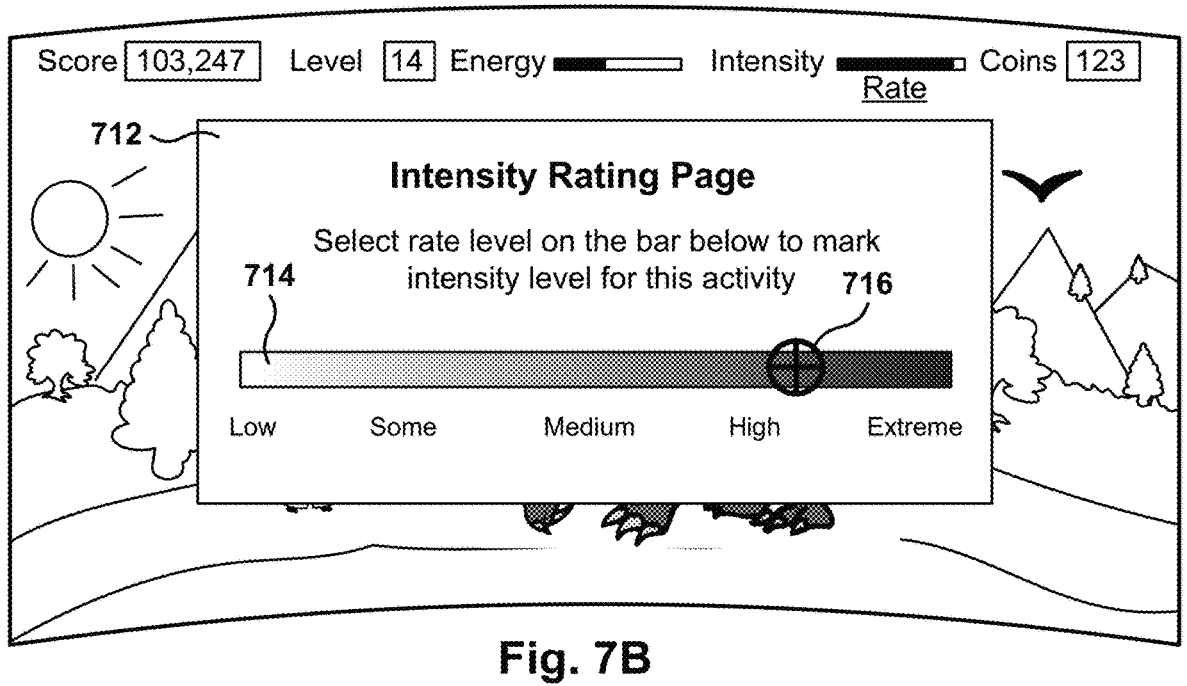
FIG. 7B is an interface for rating the intensity level in a game, according to one embodiment.

FIG. 7B is an interface for rating the intensity level in the game, according to one embodiment. After the player has selected the Rate option as discussed above with reference to FIG. 7A, interfaced 712 is provided for tagging the intensity rating. A message is provided to the user to indicate that the intensity rating value is expected (e.g., "Select rate level on the bar below to mark intensity level for this activity").

Intensity bar 714 provides a scale for the user to select the intensity value. Below the bar 714 intensity attributes are provided that go from Low to Extreme. The player then places a marker 716 to identify the intensity of this activity.

To place the marker 716, the player may use any input method provided by the user interface, such as by pushing buttons on the controller to increase or decrease the intensity, clicking with the mouse, providing a verbal command (e.g., "High Intensity"), fixing the gaze on the intensity bar 714, etc.

It is noted that the embodiments illustrated in FIGS. 7A and 7B are exemplary. Other embodiments may utilize different GUIS, different options, different ways to capture intensity tags (e.g., from 1 to 10 or 1 to 100), etc. The embodiments illustrated in FIGS. 7A and 7B should therefore not be interpreted to be exclusive or limiting, but rather exemplary or illustrative.

Figure 8A:
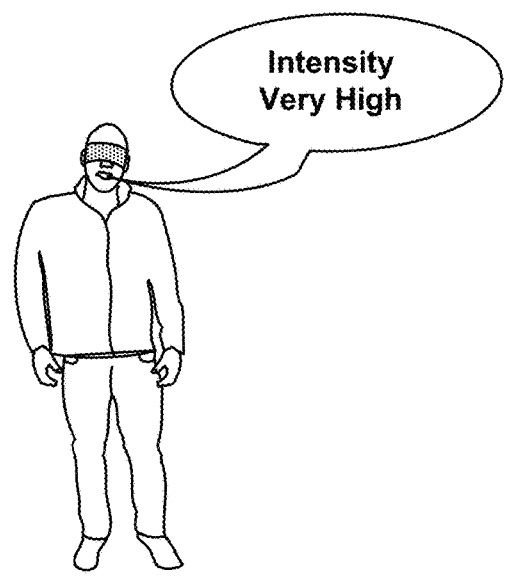
FIG. 8A illustrates a voice command to tag intensity data, according to one embodiment.

FIG. 8A illustrates a voice command to tag intensity data, according to one embodiment. In one embodiment, when prompted, the user may verbally indicate the intensity level (e.g., "Intensity Very High"). In another embodiment, the user may enter the intensity level by saying one of several intensity entry commands at any time while wearing the HMD.

By allowing the player to enter the intensity level at any time, it is more likely that the player will spend the time to identify the immersion level. In one embodiment, the game pauses for a short period to compensate for the loss of time to enter the intensity value (e.g., 1 to 5 seconds, although other values are also possible such as 1 to 15 seconds).

In one embodiment, the game rewards the player for entering intensity levels while playing the game. For example, the game may give the player some amount of currency or energy each time the player enters an intensity tag, or the game may give the player a bigger reward (e.g., an extra life or a new weapon) after the player completes a goal related to tagging intensity values (e.g., enter 25 intensity tags).

In other embodiments, the game may assign intensity tags at different times based on the physical observation of the user behavior (e.g., with a camera that is external to the HMD and with a viewing angle of the body of the user). For example, if the user becomes unstable and appears to lose her equilibrium, then the game may identify a tag value for a high intensity activity. In addition, the HMD may track the eyes of the player and determine the erratic behavior (e.g., rapid movement of the eyes) to determine high intensity tags. Further, the game may track the motion of the HMD itself (e.g., by monitoring gyroscopic information provided by inertial sensors in the HMD) and determine when the user becomes unstable or falling down, in which case a high intensity tag is created.

Figure 8B:
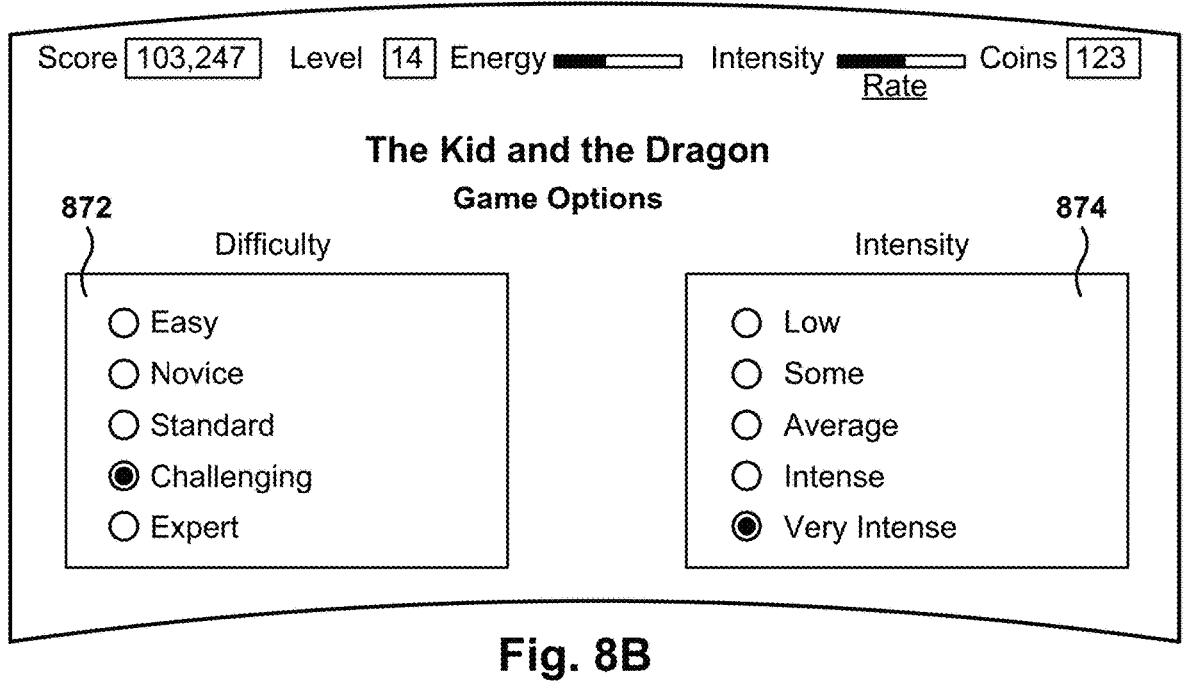
FIG. 8B is an interface for configuring the difficulty and intensity level for playing a game, according to one embodiment.

FIG. 8B is an interface for configuring the difficulty and intensity level for playing a game, according to one embodiment. At the beginning of a game, or during the game, the player has an option to configure game parameters, such as the game difficulty 872 and the desired intensity level 874.

In one embodiment, the intensity level 874 is selected by selecting one of five radio buttons, each radio button corresponding to one of the intensity options: Low, Some, Average, Intense, and Very Intense. In other embodiments, other ways of selecting the intensity are also possible, such as by selecting one of three options (e.g., Mild, Average, or High), or by selecting within a range (e.g., rate from 1 to 10, with 10 corresponding to the highest intensity possible, or from 1 to 100), or by increasing or decreasing the intensity level from a previously played game (e.g., lower intensity level from previously played game).

Once the intensity is set by the user, the game will adapt the sensory outputs in order to accommodate the selected level. For example, if a user wants an average intensity, game activities that are associated with an intensity higher than average will be eliminated or transformed to deliver the desired intensity.

Figure 9A:
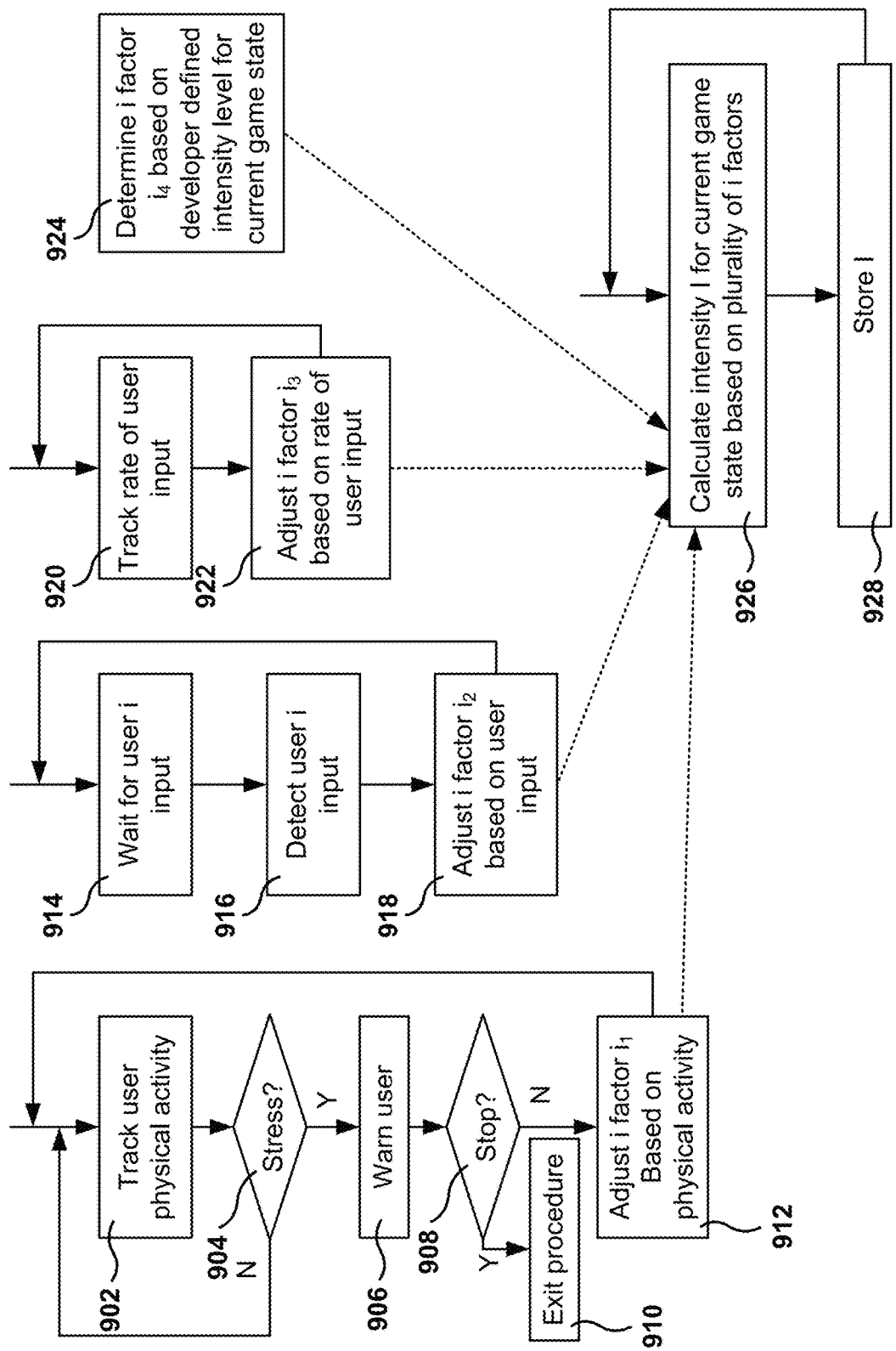
FIG. 9A is a flowchart for calculating game intensity based on a plurality of intensity factors, according to one embodiment.

FIG. 9A is a flowchart for calculating game intensity based on a plurality of intensity factors, according to one embodiment. While the various operations in this flowchart are presented and described sequentially, one of ordinary skill will appreciate that some or all of the operations may be executed in a different order, be combined or omitted, or be executed in parallel.

In one embodiment, the intensity I delivered by the HMD is calculated dynamically based on a plurality of factors. Each factor contributes to the determination on the level of intensity provided at a given time.

The factors determining the intensity may include one or more of physical manifestations of the user, user input for selecting intensity, user configuration of the game, rate of user input while playing the game (e.g., rapidly pushing buttons on the controller may indicate that the user is fully engaged in the game and assume a high intensity stage), game-defined intensity levels for different areas of the virtual world and different activities, profile of the user, intensity ratings from other users, etc.

In one embodiment, user activity is tracked in operation 902. From operation 902 the method flows to operation 904 where a check is made to determine if the user is under stress (e.g., by moving erratically). If the user is not under stress the method flows back to operation 902, and if the user is under stress the method flows to operation 906 where a warning is provided to the user. From operation 906, the method flows to operation 908 where the user is prompted 908 if the user wishes to stop the game or the current activity. If the user wants to stop, the method flows to operation 910 where an exit procedure is initiated. However, if the user does not wish to stop the method flows to operation 912, where intensity factor $i_1$ is adjusted based on the observed user physical activity.

Regarding intensity factor $i_2$, in operation 914 the computer program waits for user input regarding intensity settings. In operation 916 a user intensity input i is detected, and from operation 916 the method flows to operation 918, where intensity factor $i_2$ is adjusted based on the user intensity input. For example, if the user feels overwhelmed, the user may say "lower intensity" causing the game to lower the intensity level.

Regarding intensity factor $i_3$, in operation 920 the rate of user input is tracked or monitored. In one embodiment, the rate of user input is calculated as number of buttons pushed on a controller per minute (or for some other period like 5 seconds), and in another embodiment the rate of user input is based on buttons pushed and verbal commands issued (e.g., number of button pushes and verbal commands issued per time period).

From operation 920 the method flows to operation 922, where intensity factor $i_3$ is adjusted based on the rate of user input determined in operation 920.

With reference to intensity factor $i_4$, in operation 924 intensity factor $i_4$ is determined based on developer defined intensity levels for the current game state. The game state may be based on one or more of a location in the virtual world, game activity taking place, amount of time the player has been immersed in the virtual world, experience of the player, etc.

In operation 926, the global intensity value I is calculated for the current game state based on the plurality of intensity factors determined in operations 912, 918, 922, and 924 (i.e., $i_1$, $i_2$, $i_3$ and $i_4$). In operation 928, the calculated intensity value I is stored in memory.

It is noted that the embodiments illustrated in FIG. 9A are exemplary. Other embodiments may utilize different intensity factors or a different number of intensity factors. The embodiments illustrated in FIG. 9A should therefore not be interpreted to be exclusive or limiting, but rather exemplary or illustrative.

Figure 9B:
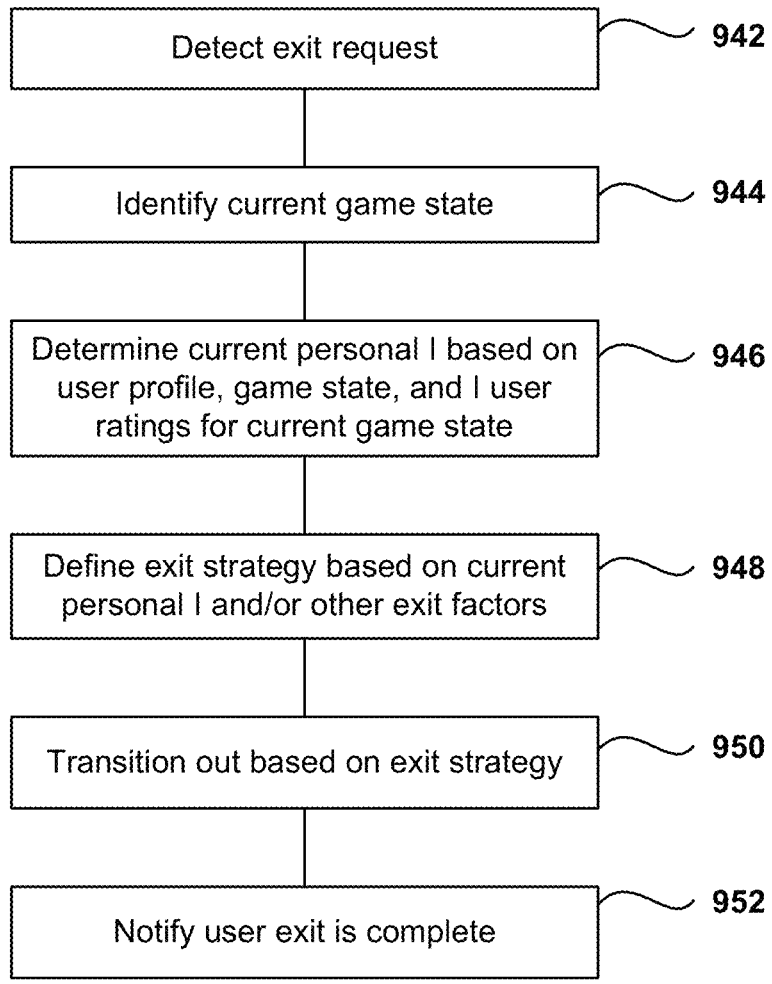
FIG. 9B is a flowchart for setting the exit strategy for leaving a game played with a Head Mounted Display (HMD), according to one embodiment.

FIG. 9B is a flowchart for setting the exit strategy for leaving a game played with a Head Mounted Display (HMD), according to one embodiment. While the various operations in this flowchart are presented and described sequentially, one of ordinary skill will appreciate that some or all of the operations may be executed in a different order, be combined or omitted, or be executed in parallel.

In operation 942, an exit request is detected (e.g., the user selects the option to pause or end the game, or an option to take off the HMD). From operation 942, the method flows to operation 944 where the game identifies the current game state based on different game parameters, as discussed above. From operation 944, the method flows to operation 946, where the current personal intensity I is determined based on the user profile, the game state, and user intensity ratings for the current game state obtained from a plurality of users. The current personal intensity I is defined as the current value of the sensory output intensity produced by the HMD.

From operation 946, the method flows to operation 948 where an exit strategy is defined based on the current intensity level for the user and other exit factors, such as the ones discussed above with reference to FIG. 9A. From operation 948, the method flows to operation 950 where the game transitions to acclimate out the player based on the exit strategy (see for example transition described above with reference to FIGS. 3A-3C).

After the player is transitioned out in operation 950, the method flows to operation 952 where a notification is provided to the user that the exit process is complete and the user may now take off the HMD.

Figure 9C:
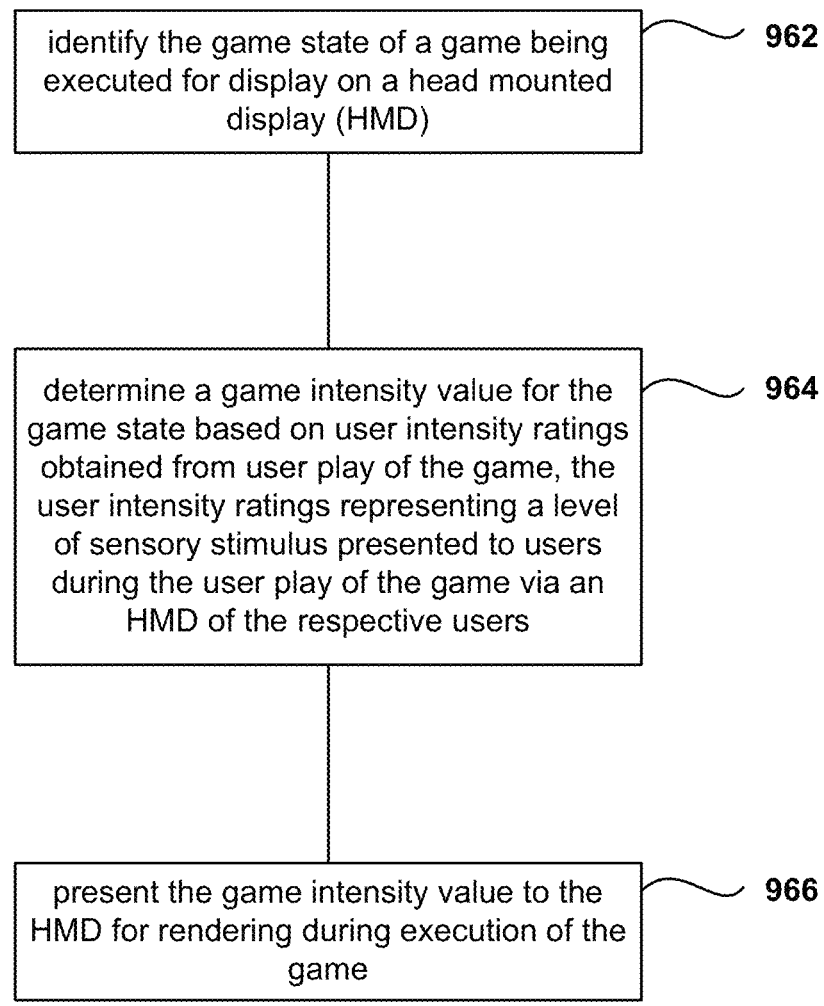
FIG. 9C is a flowchart for presenting the intensity data to a user playing a game with an HMD, according to one embodiment.

FIG. 9C is a flowchart for presenting the intensity data to a user playing a game with an HMD, according to one embodiment. While the various operations in this flowchart are presented and described sequentially, one of ordinary skill will appreciate that some or all of the operations may be executed in a different order, be combined or omitted, or be executed in parallel.

In operation 962, a game state is identified for a game being executed for display on a head mounted display (HMD). From operation 962, the method flows to operation 964, where a game intensity value is determined for said game state based on user intensity ratings obtained from user play of the game. The user intensity ratings represent the level of sensory stimulus presented to users during the user play of the game via an HMD of the respective users.

From operation 964, the method flows to operation 966 for presenting the game intensity value to the HMD for rendering during execution of the game. In one embodiment, the operations of the method are executed by a processor.

Figure 10:
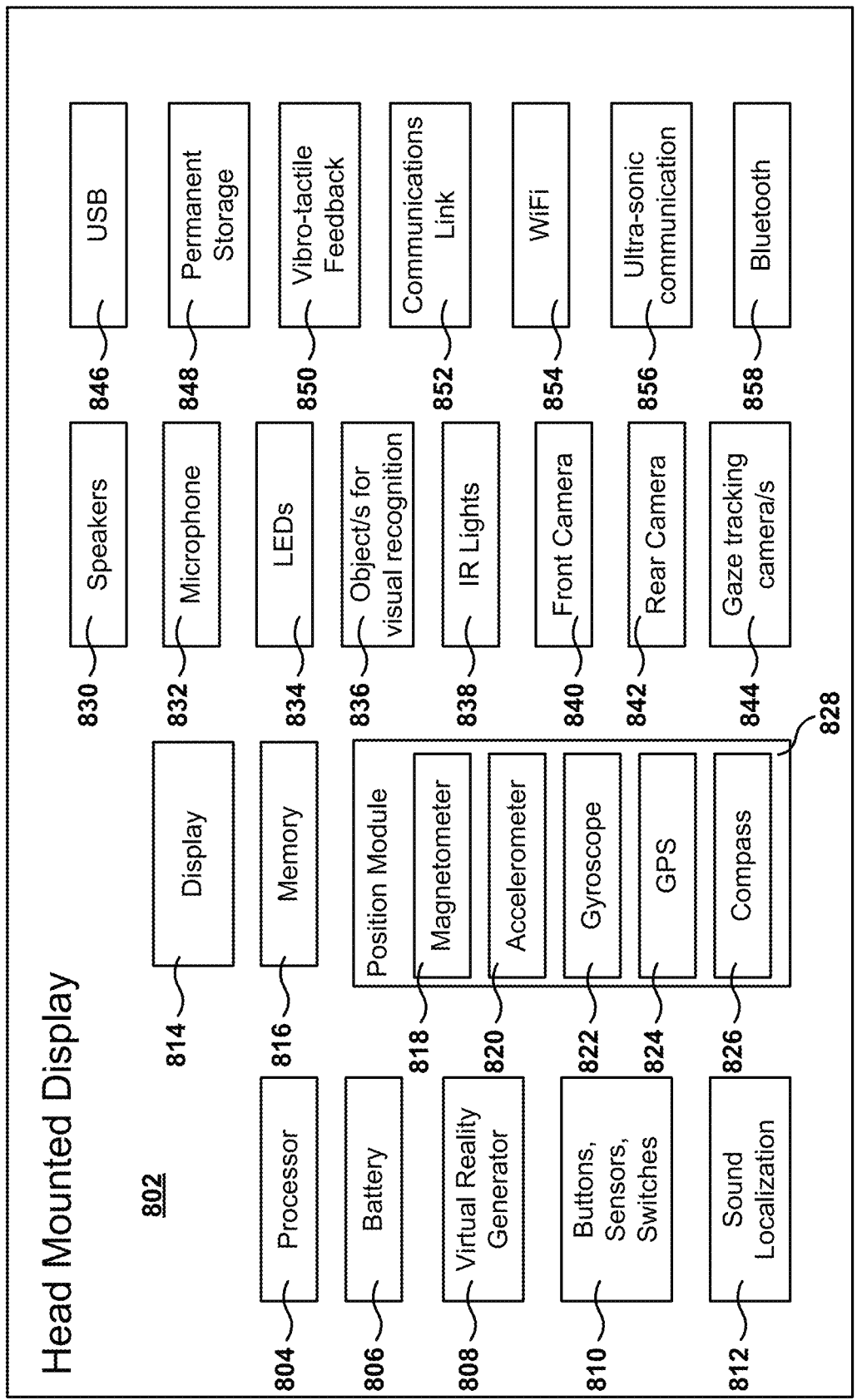
FIG. 10 illustrates the architecture of a device that may be used to implement embodiments.

FIG. 10 illustrates the architecture of a device that may be used to implement embodiments. The head mounted display is a computing device and includes modules usually found on a computing device, such as a processor 804, memory 816 (RAM, ROM, etc.), one or more batteries 806 or other power sources, and permanent storage 848 (such as a hard disk).

The communication modules allow the HMD to exchange information with other portable devices, other computers, other HMD's, servers, etc. The communication modules include a Universal Serial Bus (USB) connector 846, a communications link 852 (such as Ethernet), ultrasonic communication 856, Bluetooth 858, and WiFi 854.

The user interface includes modules for input and output. The input modules include input buttons, sensors and switches 810, microphone 832, touch sensitive screen (not shown, that may be used to configure or initialize the HMD), front camera 840, rear camera 842, gaze tracking cameras 844. Other input/output devices, such as a keyboard or a mouse, can also be connected to the portable device via communications link, such as USB or Bluetooth.

The output modules include the display 814 for rendering images in front of the user's eyes. Some embodiments may include one display, two displays (one for each eye), micro projectors, or other display technologies. Other output modules include Light-Emitting Diodes (LED) 834 (which may also be used for visual tracking of the HMD), vibro-tactile feedback 850, speakers 830, and sound localization module 812, which performs sound localization for sounds to be delivered to speakers or headphones, providing a 3D sound simulation for objects rendered or displayed in the HMD to provide real-time 3D effect sounds. Other output devices, such as headphones, can also connect to the HMD via the communication modules.

The elements that may be included to facilitate motion tracking include LEDs 834, one or more objects for visual recognition 836, and infrared lights 838.

Information from different devices can be used by the Position Module 828 to calculate the position of the HMD. These modules include a magnetometer 818, an accelerometer 820, a gyroscope 822, a Global Positioning System (GPS) module 824, and a compass 826. Additionally, the Position Module can analyze sound or image data captured with the cameras and the microphone to calculate the position. Further yet, the Position Module can perform tests to determine the position of the portable device or the position of other devices in the vicinity, such as WiFi ping test or ultrasound tests.

A Virtual Reality Generator 808 creates the virtual or augmented reality, as previously described, using the position calculated by the Position Module. The virtual reality generator 808 may cooperate with other computing devices (e.g., game console, Internet server, etc.) to generate images for the display module 814. The remote devices may send screen updates or instructions for creating game objects on the screen.

The HMD 802 may be used for playing games, as discussed above, or for any other immersive experience. In one embodiment, the HMD is used for virtual inspection of a real world location, such as a hotel. This way, a user considering whether to go to a certain hotel may take a virtual tour with the HMD to check the hotel facilities and accommodations. In one embodiment, if the user likes the hotel, the user may also get reservations for the hotel during the virtual tour by accessing a menu that provides prices, choices, and available dates.

In another embodiment, the HMD may be used for shopping, such as by traveling with the HMD through a real store or a virtual store. As the user moves around the store, the user is able to check different items (e.g., articles for sale). If the user wants to purchase one or more items, a menu is provided for checking out the articles desired (e.g., virtual checkout).

In another embodiment, the virtual tour may be used for virtual tourism, allowing the HMD-wearing user to travel different locations around the world (e.g., the wall of China, the Golden Gate Bridge, the Eiffel Tower, etc.). An option may be provided to allow the user to do travel reservations to visit the desired location.

In one embodiment, the HMD is used for education. Students may access virtual lessons immersed in a virtual reality, or students may access class materials, in a classroom setting, using the HMD. For example, our students can travel through a virtual museum with a teacher, which provides description about the different pieces of art. In one embodiment, the view of the HMD is set by the teacher and the student's travel the virtual world sharing the same images as the teacher. This way, students may not wonder and visit other areas of the museum while the teacher is given a lecture.

In one embodiment, the rendering engine for the virtual reality generator utilizes forward prediction for the motions of the user, predicting which parts of the virtual world will the user visit. For example, if the user starts turning the head to the right, the rendering engine will start generating data to the right of the current view assuming that the user will continue turning to the right. Additionally, the rendering engine may provide higher resolution to the images on the right that the images on the left, because the user is turning her attention towards the right.

In one embodiment, an Application Programming Interface (API) is provided for developers to access the functionality of the HMD. The API may be provided for programs to be executed on the HMD, as well as for remote calls to access functionality within the HMD. In addition, the API may provide interfaces for accessing another device that is associated with the HMD, such as a game console in communication with the HMD, or any other devices interfacing with the HMD (e.g., a camera connected to the game console that tracks the movements of the user wearing the HMD). In one embodiment, a Software Development Kit (SDK) is provided to assist developers in creating applications that exploit the functionality of the API.

It should be appreciated that the embodiment illustrated in FIG. 10 is an exemplary implementation of a portable device. Other embodiments may utilize different modules, a subset of the modules, or assign related tasks to different modules. Additionally, the elements of the HMD may have different sizes, with some HMDs having miniaturized components to reduce a size of the HMD. In one embodiment, the HMD may look like a pair of glasses, where the virtual or augmented worlds are presented on the glass of the glasses or projected onto the retina of the user wearing the HMD. The embodiment illustrated in FIG. 10 should therefore not be interpreted to be exclusive or limiting, but rather exemplary or illustrative.

Figure 11:
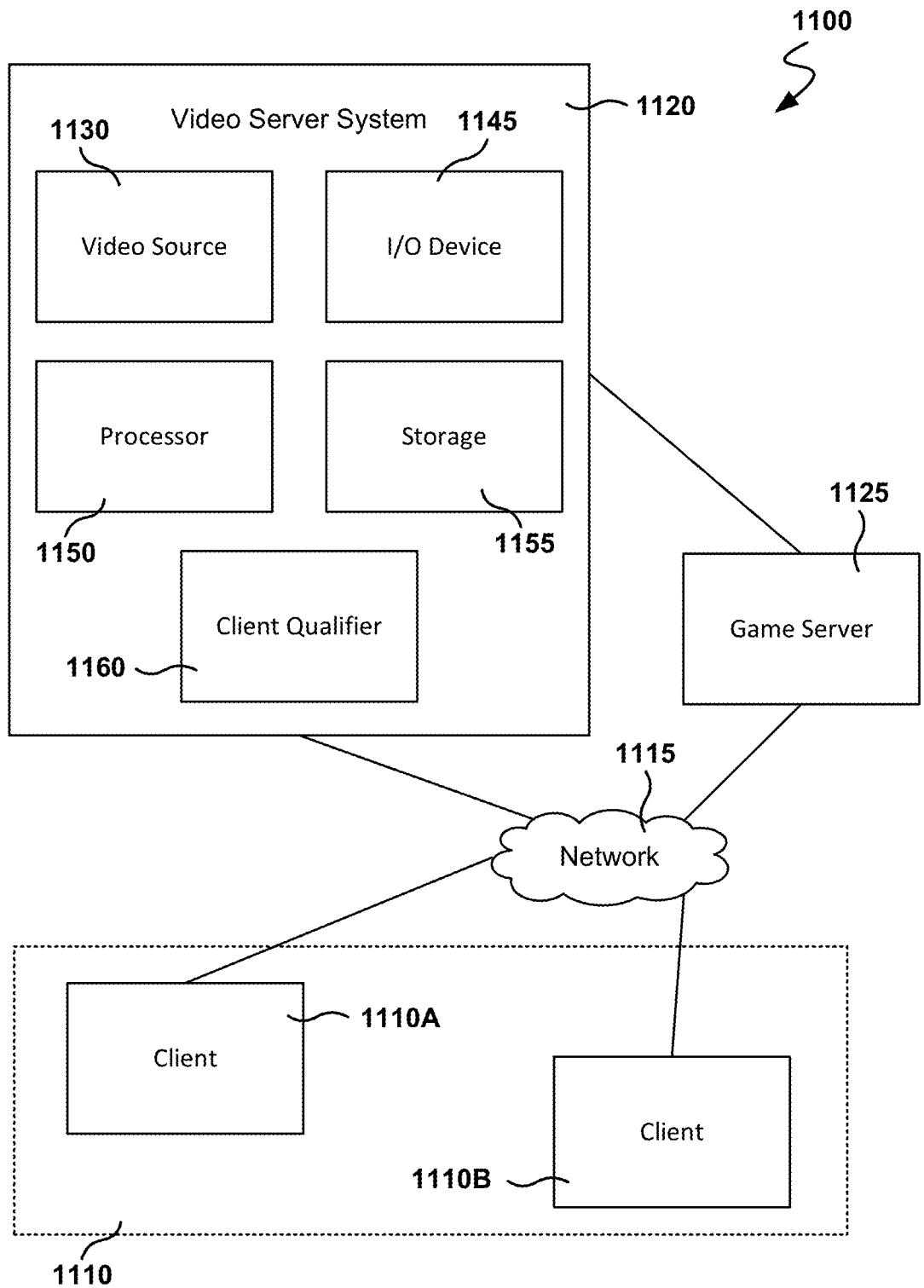
FIG. 11 is a block diagram of a game system, according to various embodiments.

FIG. 11 is a block diagram of a Game System 1100, according to various embodiments. Game System 1100 is configured to provide a video stream to one or more Clients 1110 via a Network 1115. Game System 1100 typically includes a Video Server System 1120 and an optional game server 1125. Video Server System 1120 is configured to provide the video stream to the one or more Clients 1110 with a minimal quality of service. For example, Video Server System 1120 may receive a game command that changes the state of or a point of view within a video game, and provide Clients 1110 with an updated video stream reflecting this change in state with minimal lag time. The Video Server System 1120 may be configured to provide the video stream in a wide variety of alternative video formats.

Clients 1110, referred to herein individually as 1110A, 1110B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1110 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1110 or on a separate device such as a monitor or television. Clients 1110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1110 are optionally geographically dispersed. The number of clients included in Game System 1100 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1120 to deliver a game viewed through the HMD. In one embodiment, the game console receives the video stream from the video server system 1120, and the game console forwards the video stream, or updates to the video stream, to the HMD for rendering.

Clients 1110 are configured to receive video streams via Network 1115. Network 1115 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1110 may, but are not required to, further include systems configured for modifying received video. For example, a client may be configured to perform further rendering, to overlay one video image on another video image, to crop a video image, and/or the like. For example, Clients 1110 may be configured to receive various types of video frames, such as I-frames, P-frames and B-frames, and to process these frames into images for display to a user. In some embodiments, a member of Clients 1110 is configured to perform further rendering, shading, conversion to 3-D, optical distortion processing for HMD optics, or like operations on the video stream. A member of Clients 1110 is optionally configured to receive more than one audio or video stream. Input devices of Clients 1110 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1110 is generated and provided by Video Server System 1120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1110 are typically configured to receive inputs from a user. These inputs may include game commands configured to change the state of the video game or otherwise affect game play. The game commands can be received using input devices and/or may be automatically generated by computing instructions executing on Clients 1110. The received game commands are communicated from Clients 1110 via Network 1115 to Video Server System 1120 and/or Game Server 1125. For example, in some embodiments, the game commands are communicated to Game Server 1125 via Video Server System 1120. In some embodiments, separate copies of the game commands are communicated from Clients 1110 to Game Server 1125 and Video Server System 1120. The communication of game commands is optionally dependent on the identity of the command. Game commands are optionally communicated from Client 1110A through a different route or communication channel that that used to provide audio or video streams to Client 1110A.

Game Server 1125 is optionally operated by a different entity than Video Server System 1120. For example, Game Server 1125 may be operated by the publisher of a multi-player game. In this example, Video Server System 1120 is optionally viewed as a client by Game Server 1125 and optionally configured to appear from the point of view of Game Server 1125 to be a prior art client executing a prior art game engine. Communication between Video Server System 1120 and Game Server 1125 optionally occurs via Network 1115. As such, Game Server 1125 can be a prior art multiplayer game server that sends game state information to multiple clients, one of which is game server system 1120. Video Server System 1120 may be configured to communicate with multiple instances of Game Server 1125 at the same time. For example, Video Server System 1120 can be configured to provide a plurality of different video games to different users. Each of these different video games may be supported by a different Game Server 1125 and/or published by different entities. In some embodiments, several geographically distributed instances of Video Server System 1120 are configured to provide game video to a plurality of different users. Each of these instances of Video Server System 1120 may be in communication with the same instance of Game Server 1125. Communication between Video Server System 1120 and one or more Game Server 1125 optionally occurs via a dedicated communication channel. For example, Video Server System 1120 may be connected to Game Server 1125 via a high bandwidth channel that is dedicated to communication between these two systems.

Video Server System 1120 comprises at least a Video Source 1130, an I/O Device 1145, a Processor 1150, and non-transitory Storage 1155. Video Server System 1120 may include one computing device or be distributed among a plurality of computing devices. These computing devices are optionally connected via a communications system such as a local area network.

Video Source 1130 is configured to provide a video stream, e.g., streaming video or a series of video frames that form a moving picture. In some embodiments, Video Source 1130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1125. Game Server 1125 may maintain a copy of the state of the game based on game commands received from multiple players using geographically disperse clients. In these cases, the game state is provided by Game Server 1125 to Video Source 1130, wherein a copy of the game state is stored and rendering is performed. Game Server 1125 may receive game commands directly from Clients 1110 via Network 1115, and/or may receive game commands via Video Server System 1120.

Video Source 1130 typically includes rendering logic, e.g., hardware, firmware, and/or software stored on a computer readable medium such as Storage 1155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1130 includes a video recording device such as a camera. This camera may be used to generate delayed or live video that can be included in the video stream of a computer game. The resulting video stream, optionally includes both rendered images and images recorded using a still or video camera. Video Source 1130 may also include storage devices configured to store previously recorded video to be included in a video stream. Video Source 1130 may also include motion or positioning sensing devices configured to detect motion or position of an object, e.g., person, and logic configured to determine a game state or produce video-based on the detected motion and/or position.

Video Source 1130 is optionally configured to provide overlays configured to be placed on other video. For example, these overlays may include a command interface, log in instructions, messages to a game player, images of other game players, video feeds of other game players (e.g., webcam video). In embodiments of Client 1110A including a touch screen interface or a gaze detection interface, the overlay may include a virtual keyboard, joystick, touch pad, and/or the like. In one example of an overlay a player's voice is overlaid on an audio stream. Video Source 1130 optionally further includes one or more audio sources.

In embodiments wherein Video Server System 1120 is configured to maintain the game state based on input from more than one player, each player may have a different point of view comprising a position and direction of view. Video Source 1130 is optionally configured to provide a separate video stream for each player based on their point of view.

Further, Video Source 1130 may be configured to provide a different frame size, frame data size, and/or encoding to each of Client 1110. Video Source 1130 is optionally configured to provide 3-D video.

I/O Device 1145 is configured for Video Server System 1120 to send and/or receive information such as video, commands, requests for information, a game state, gaze information, device motion, device location, user motion, client identities, player identities, game commands, security information, audio, and/or the like. I/O Device 1145 typically includes communication hardware such as a network card or modem. I/O Device 1145 is configured to communicate with Game Server 1125, Network 1115, and/or Clients 1110.

Processor 1150 is configured to execute logic, e.g. software, included within the various components of Video Server System 1120 discussed herein. For example, Processor 1150 may be programmed with software instructions in order to perform the functions of Video Source 1130, Game Server 1125, and/or a Client Qualifier 1160. Video Server System 1120 optionally includes more than one instance of Processor 1150. Processor 1150 may also be programmed with software instructions in order to execute commands received by Video Server System 1120, or to coordinate the operation of the various elements of Game System 1100 discussed herein. Processor 1150 may include one or more hardware device. Processor 1150 is an electronic processor.

Storage 1155 includes non-transitory analog and/or digital storage devices. For example, Storage 1155 may include an analog storage device configured to store video frames. Storage 1155 may include a computer readable digital storage, e.g. a hard drive, an optical drive, or solid state storage. Storage 1115 is configured (e.g. by way of an appropriate data structure or file system) to store video frames, artificial frames, a video stream including both video frames and artificial frames, audio frame, an audio stream, and/or the like. Storage 1155 is optionally distributed among a plurality of devices. In some embodiments, Storage 1155 is configured to store the software components of Video Source 1130 discussed elsewhere herein. These components may be stored in a format ready to be provisioned when needed.

Video Server System 1120 optionally further comprises Client Qualifier 1160. Client Qualifier 1160 is configured for remotely determining the capabilities of a client, such as Clients 1110A or 1110B. These capabilities can include both the capabilities of Client 1110A itself as well as the capabilities of one or more communication channels between Client 1110A and Video Server System 1120. For example, Client Qualifier 1160 may be configured to test a communication channel through Network 1115.

Client Qualifier 1160 can determine (e.g., discover) the capabilities of Client 1110A manually or automatically. Manual determination includes communicating with a user of Client 1110A and asking the user to provide capabilities. For example, in some embodiments, Client Qualifier 1160 is configured to display images, text, and/or the like within a browser of Client 1110A. In one embodiment, Client 1110A is an HMD that includes a browser. In another embodiment, client 1110A is a game console having a browser, which may be displayed on the HMD. The displayed objects request that the user enter information such as operating system, processor, video decoder type, type of network connection, display resolution, etc. of Client 1110A. The information entered by the user is communicated back to Client Qualifier 1160.

Automatic determination may occur, for example, by execution of an agent on Client 1110A and/or by sending test video to Client 1110A. The agent may comprise computing instructions, such as java script, embedded in a web page or installed as an add-on. The agent is optionally provided by Client Qualifier 1160. In various embodiments, the agent can find out processing power of Client 1110A, decoding and display capabilities of Client 1110A, lag time reliability and bandwidth of communication channels between Client 1110A and Video Server System 1120, a display type of Client 1110A, firewalls present on Client 1110A, hardware of Client 1110A, software executing on Client 1110A, registry entries within Client 1110A, and/or the like.

Client Qualifier 1160 includes hardware, firmware, and/or software stored on a computer readable medium. Client Qualifier 1160 is optionally disposed on a computing device separate from one or more other elements of Video Server System 1120. For example, in some embodiments, Client Qualifier 1160 is configured to determine the characteristics of communication channels between Clients 1110 and more than one instance of Video Server System 1120. In these embodiments the information discovered by Client Qualifier can be used to determine which instance of Video Server System 1120 is best suited for delivery of streaming video to one of Clients 1110.

Embodiments may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relate to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method comprising:
    identifying a plurality of game states of a game when rendered for display on a head mounted display (HMD);
    calculating game intensity values for said plurality of game states based on tracked user behavior obtained from one or more users during prior gaming sessions of the game, the tracked user behavior provides information regarding sensory stimulus experienced during said plurality of game states; and
    adjusting, during a current session, said game intensity values for content presented to a user, the adjusting reduces graphical elements rendered for a scene being presented on a display of the HMD;
    wherein the identifying and calculating is processed by a cloud computing system for said tracked user behavior during said prior gaming sessions, and wherein said cloud computing system further processing the adjusting of the game intensity values for content during the current game session for the use; wherein said HMD receives streaming video for said game and renders to the display of the HMD.

2. The method of claim 1, wherein the game intensity values are calculated from feedback received from the one or more users during said prior game session of the game, the game intensity values being associated to areas in the game where higher levels of intensity is anticipated.

3. The method of claim 2, wherein said feedback is captured from physical manifestations of the one or more users during play of the game during said prior game sessions.

4. The method of claim 3, wherein the physical manifestations are associated with eye movement or head movements of the one or more users.

5. The method of claim 4, wherein the eye movement is tracked using a camera, and wherein some eye movement includes erratic or rapid movement indicative of a potential of motion sickness.

6. The method of claim 1, wherein said adjusting for the user of the current user is processed based on profile of the user that defines a level of intensity that is acceptable to the user and a current game state that is associated with one or more of said game intensity values.

7. The method as recited in claim 1, wherein the tracked user behavior is associated to one or more of a current game level, or a user play history, or a user age, or a rate of user input for a game state, or a combination of two or more thereof.

8. The method as recited in claim 1, wherein calculating the game intensity value further includes:
    calculating a weighted average of parameters related to intensity contributing inputs obtained from users by weighted averaging two or more of physical responses of users while playing the game, or current game level, or user play history, or user age, or rate of user input for the game state, or game developer intensity settings for the game state, or type of game activity configured to take place.

9. The method as recited in claim 1, further comprising,
    providing, for rendering by the HMD, one or more of a game intensity bar, or a numerical value, or a sound, or a verbal output, or a color selected from a plurality of colors associated with respective game intensity values or a combination of two or more thereof.

10. The method as recited in claim 1, wherein the scene presented on a display of the HMD is one of a virtual reality scene or an augmented reality scene.

11. The method of claim 1, wherein the identifying and calculating is processed by a cloud computing system for said tracked user behavior during said prior gaming sessions, and wherein said cloud computing system further processing the adjusting of the game intensity values for content during the current game session for the use; wherein said HMD receives streaming video for said game and renders to the display of the HMD.

12. A method comprising:
    identifying a plurality of game states of a game when rendered for display on a head mounted display (HMD);
    calculating, by a computer, game intensity values for said plurality of game states based on tracked user behavior obtained from one or more users during prior gaming sessions of the game, the tracked user behavior provides information regarding sensory stimulus experienced during said plurality of game states; and
    adjusting, during a current session, said game intensity values for content presented to a user, the adjusting reduces graphical elements rendered for a scene being presented on a display of the HMD;
    wherein the game intensity values are calculated from feedback received from the one or more users during said prior game session of the game, the game intensity values being associated to areas in the game where higher levels of intensity is anticipated;
    wherein said feedback is received inputs received from said one or more users, the inputs include a rating of intensity perceived by said one or more users;
    wherein the inputs represent tags that associate the rating of intensity to specific areas in a virtual space of the game presented via the HMD.

13. The method of claim 12, wherein clusters of said tags identify each of the specific areas in the virtual space.

14. A method comprising:
    identifying a plurality of game states of a game when rendered for display on a head mounted display (HMD);
    calculating, by a computer, game intensity values for said plurality of game states based on tracked user behavior obtained from one or more users during prior gaming sessions of the game; and
    adjusting, during a current session, said game intensity values for content presented to a user, the adjusting reduces graphical elements rendered for a scene being presented on a display of the HMD, wherein the tracked user behavior includes tracked eye movement that is indicative a possibility of vertigo.

15. Computer readable media having program instructions for presenting content to a head mounted display (HMD), comprising:
program instructions for identifying a plurality of game states of a game when rendered for display on a head mounted display (HMD);
program instructions for calculating, by a computer, game intensity values for said plurality of game states based on tracked user behavior obtained from one or more users during prior gaming sessions of the game, the tracked user behavior provides information regarding sensory stimulus experienced during said plurality of game states; and
program instructions for adjusting, during a current session, said game intensity values for content presented to a user, the adjusting reduces graphical elements rendered for a scene being presented on the display of the HMD, wherein the tracked user behavior includes tracked eye movement that is processed to determine an indication of vertigo.

16. The computer readable media of claim 15, wherein the game intensity values are calculated from feedback received from the one or more users during said prior game session of the game, the game intensity values being associated to areas in the game where higher levels of intensity is anticipated.

17. The computer readable media of claim 15, wherein said adjusting for the user of the current user is processed based on profile of the user that defines a level of intensity that is acceptable to the user and a current game state that is associated with one or more of said game intensity values.

18. Computer readable media having program instructions for presenting content to a head mounted display (HMD), comprising:
program instructions for identifying a plurality of game states of a game when rendered for display on a head mounted display (HMD);
program instructions for calculating, by a computer, game intensity values for said plurality of game states based on tracked user behavior obtained from one or more users during prior gaming sessions of the game; and
program instructions for adjusting, during a current session, said game intensity values for content presented to a user, the adjusting reduces graphical elements rendered for a scene being presented on the display of the HMD;
wherein the tracked user behavior is associated to one or more of a current game level, or a user play history, or a user age, or a rate of user input for a game state, or a combination of two or more thereof; and
wherein the identifying and calculating is processed by a cloud computing system for said tracked user behavior during said prior gaming sessions, and wherein said cloud computing system further processing the adjusting of the game intensity values for content during the current game session for the use; wherein said HMD receives streaming video for said game and renders to the display of the HMD.

\* \* \* \* \*